US009092533B1

(12) United States Patent
Demathieu

(10) Patent No.: US 9,092,533 B1
(45) Date of Patent: Jul. 28, 2015

(54) LIVE, REAL TIME BOOKMARKING AND SHARING OF PRESENTATION SLIDES

(75) Inventor: Jean-Georges Erik Demathieu, Albany, CA (US)

(73) Assignee: iBlinks Inc., Berkeley, CA (US)

( * ) Notice: Subject to any disclaimer, the term of this patent is extended or adjusted under 35 U.S.C. 154(b) by 213 days.

(21) Appl. No.: 13/407,597

(22) Filed: Feb. 28, 2012

Related U.S. Application Data

(60) Provisional application No. 61/447,803, filed on Mar. 1, 2011.

(51) Int. Cl.
*G06F 17/30* (2006.01)

(52) U.S. Cl.
CPC ................................ *G06F 17/30873* (2013.01)

(58) Field of Classification Search
CPC .................................................. G06F 17/30873
See application file for complete search history.

(56) References Cited

U.S. PATENT DOCUMENTS

| 6,654,785 | B1 * | 11/2003 | Craig | 709/203 |
| 2005/0055643 | A1 * | 3/2005 | Quimby | 715/763 |
| 2008/0126943 | A1 * | 5/2008 | Parasnis et al. | 715/730 |
| 2009/0144392 | A1 * | 6/2009 | Wang et al. | 709/217 |
| 2010/0174773 | A1 * | 7/2010 | Penner et al. | 709/203 |

* cited by examiner

*Primary Examiner* — Scott Baderman
*Assistant Examiner* — Asher Kells
(74) *Attorney, Agent, or Firm* — Brill Law Office

(57) ABSTRACT

Individual slides of a live presentation are isolated and processed in real-time. A digital presentation document comprising multiple slides in a specific sequence is read. For each specific slide in the presentation document, a corresponding separate slide object can be created. While the slides of the presentation are being displayed on a video output device, users can bookmark the specific slide currently being displayed. Associations are stored between specific users and their bookmarked slides, which can be used to subsequently provide the individual bookmarked slides to the corresponding users. Users can also post links to specific slides being displayed to their accounts on various sites, such as third-party social networking sites. Additionally, the specific slide currently being displayed on the video output device can be maintained at a single specific network location, which can be accessed by users operating mobile computing devices.

27 Claims, 21 Drawing Sheets

LIVE, REAL TIME BOOKMARKING AND SHARING OF PRESENTATION SLIDES

PRIORITY CLAIM

This application claims the benefit of provisional patent application Ser. No. 61/447,803, filed on Mar. 1, 2011. The provisional patent application is hereby incorporated by reference in its entirety.

TECHNICAL FIELD

This disclosure pertains generally to live presentation of content in electronic format, and more specifically to bookmarking and sharing slides of live presentations.

BACKGROUND

Presentation applications such as Microsoft PowerPoint® can be used to graphically display information in the form of a slide show. Typically, as the presenter speaks, s/he operates the presentation application running on a computer to cycle through a series of slides, which can be displayed on a large screen which is visible to members of an audience. To make a presentation to a remotely located audience over the internet, a URL may be obtained from a Microsoft server and sent via email. Also, a web based presentation application such as SlideRocket® or the presentation component of Google Docs® can be used. SlideRocket® allows a presenter to upload a presentation to a website, and email the URL to remote audience members. With SlideRocket® or Microsoft PowerPoint®, remotely located audience members can view the slide show by viewing the content at the URL at the time the presentation is made. When the presentation begins, the content at the URL is the first slide. As the presenter cycles through the slide show, the content at the URL is updated with the current slide, so that the remote audience members can follow the presentation as it is made.

Google Docs is a suite of programs that allows users to create and store documents online. Google Docs includes a presentation application. A user can view and edit his or her documents from any computer with an Internet connection. The owner of a document can also give other users viewing or editing rights. Using Google Docs, a presenter can create a presentation online (or upload one created on a client). The presentation is stored on a server, and each slide of the presentation has its own URL. When the presenter cycles through the slides of the presentation using Google Doc's presentation application, the URL being viewed is updated to the URL of the current slide. To allow a remote user to view the presentation, the owner of the presentation can give the remote user viewing rights. The remote user can then cycle through the slides of the presentation independently.

Another way to make a client or web based presentation available to remote users is with a screen sharing program, such as WebEx. A screen sharing program allows the presenter to authorize remote users to view the content of the presenter's screen on their monitors. Thus, as the presenter cycles through a client based presentation (using, e.g., PowerPoint) or a web based presentation (using, e.g., the Google Docs presentation application), as the slides of the presentation change on the user's monitor, so too are the remote user's monitors updated to display the current slide.

Presentation applications are very useful, and are frequently used in business, the sciences, academia, primary education and other fields of endeavor. However, audience members are often particularly interested in a small number of specific presentation slides, and have difficulty isolating the specific information of interest. Sometimes the presentations are made available to audience members as files or printouts, but an audience member may be interested in, for example, three slides out of five hundred. Looking through the whole presentation for the slides of interest can be time consuming and frustrating. Sometimes audience members use phone cameras to take pictures of the screen as it is displaying a slide of interest, but the resulting images are often distorted or of poor quality, particularly if the audience member is not directly in front of the screen or the room lighting is poor.

Furthermore, audience members would often like to share specific slides of interest in real-time, via social networks such as Facebook, Twitter or LinkedIn. However, the presentation is not directly accessible for sharing in real-time as it is being presented. The sharing program SlideShare allows users to upload presentations to a website and subsequently share them with other users. However, this does not allow the sharing of presentations in real-time. Instead, the users with whom an uploaded presentation is shared can scroll through the presentation independently. Furthermore, the uploading and sharing in SlideShare is at the level of the entire presentation, where users are often interested in only sharing one or more individual slides. Sharing the entire presentation passes on the problem discussed above of having to look through all of the slides for a small number of slides of interest. This is an even greater burden for users with whom the presentation is shared, because they were not present at the original presentation, and do not even know what slides they are looking for.

It would be desirable to address these issues.

SUMMARY

A computer implemented slide management system enables the isolation and processing of individual slides of a live presentation in real-time. A digital presentation document comprising multiple slides in a specific sequence is read. In one embodiment, for each specific slide in the presentation document, a corresponding separate slide object is created. The slide object can contain an image or a data description of the slide. In another embodiment, each slide of the presentation comprises a web page. Each separate slide or slide object is associated with a corresponding slide id. Each slide is displayed in the specific sequence, on a video output device such as a projection system. Multiple users are each associated with specific user ids.

In one embodiment, while the slides are being displayed on the video output device, requests from users to bookmark specific slides currently being displayed are received. In response to receiving such a request from a user, an association is stored between the user id and the slide id of the specific slide being displayed when the request was made. Subsequently, specific users can make requests for individual slides which they previously bookmarked, and the stored associations can be used to provide the corresponding specific separate slides or slide objects to the specific users.

In one embodiment, each specific user id is associated with one or more accounts on site(s) on which the user can post content, such as social networking sites. These sites can but need not be third-party sites. While the slides are being displayed on the video output device, specific users can post links to the slide currently being displayed to one or more of the (e.g., third-party) sites. In response to receiving an indication from a specific user to post a link to the slide currently being displayed to a specific site, an action is taken to do so. For example, in the case of a third-party site, a directive is sent to the specific third-party site, indicating to post a link to the specific slide on the third-party site account associated with the specific user. For example, this can take the form of sending a directive to a specific social networking site to post a message that includes the link on the user's social networking site account. Subsequent activation of the link by a party viewing the user's content on the social networking site results in providing that party with the slide.

In one embodiment, the specific slide or slide object corresponding to the slide currently being displayed on the video output device is maintained at a single specific network location, such as a single URL. This specific network location is displayed on the video output device during at least the beginning of the presentation. In response to a user operating a computing device (such as a smartphone or other mobile computing device) accessing the specific network location, the user is provided with specific separate slide or slide object corresponding to the slide currently being displayed on the video output device. In one embodiment, reduced-in-size images of the slides are created, and provided to users of mobile computing devices.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the subject matter, resort to the claims being necessary to determine such subject matter.

The Figures depict various embodiments for purposes of illustration only. One skilled in the art will readily recognize from the following discussion that other embodiments of the structures and methods illustrated herein may be employed without departing from the described principles.

DETAILED DESCRIPTION

Figure 1:
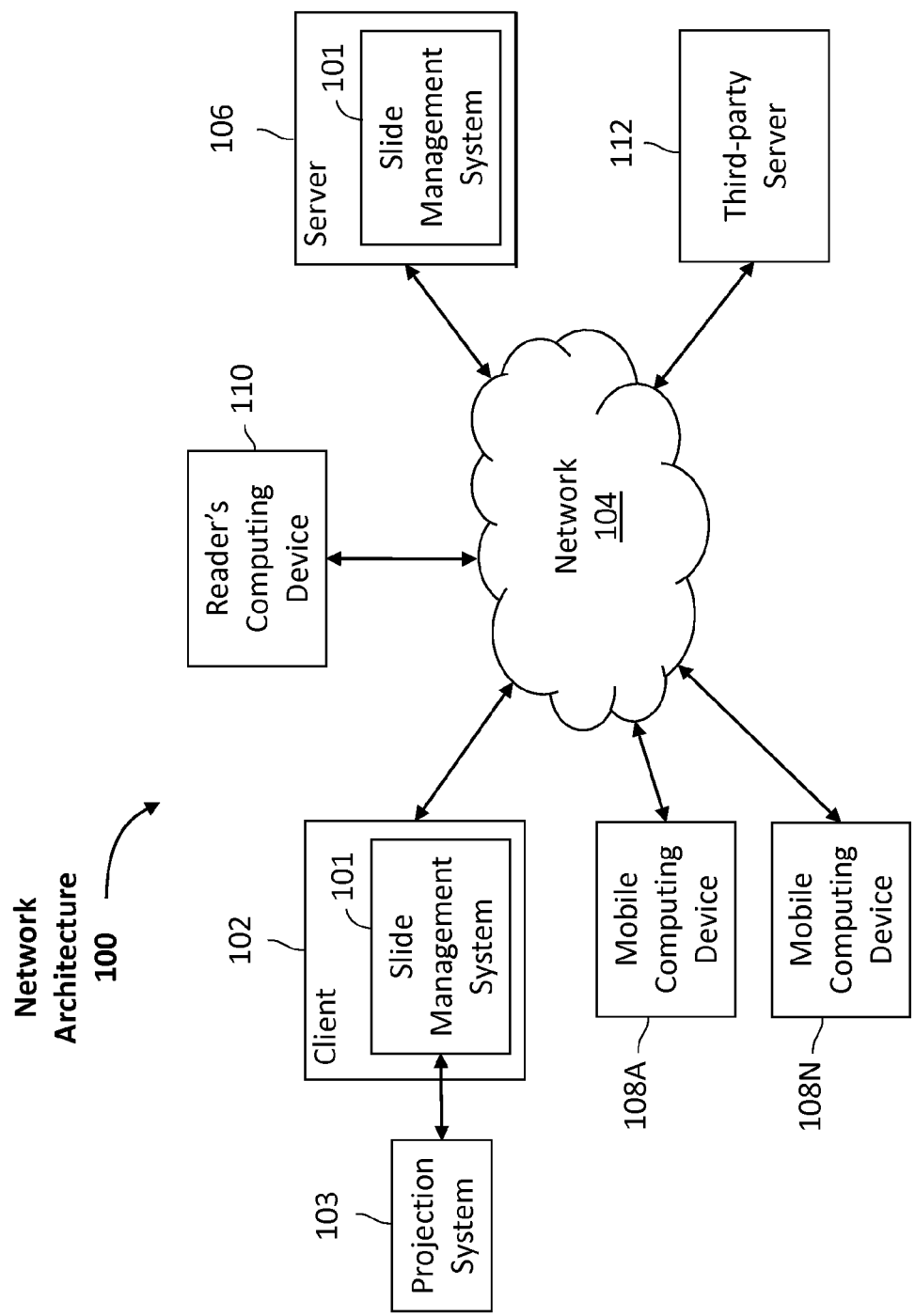
FIG. 1 is a block diagram of an example of a network environment suitable for the operation of a slide management system, according to some embodiments of the present invention.

FIG. 1 is a block diagram illustrating an exemplary network architecture 100 in which a slide management system 101 can be implemented. The illustrated network architecture 100 comprises a client 102, multiple mobile computing devices 108A and 108N, a server 106, a third party server 112 and a reader's computing device 110. The client is communicatively coupled to a projection system 103. In FIG. 1, the slide management system 101 is illustrated as being distributed between client 102 and server 106. It is to be understood that this is an example only, and in various embodiments the components of a slide management system 101 can be instantiated on a server 106, a client 102 or be distributed between multiple servers 106 and/or clients 102.

Client 102, mobile computing devices 108, reader's computing device 110 and servers 106, 112 can be implemented using computer systems 210 such as the one illustrated in FIG. 2 and described below. The client 102, mobile computing devices 108, reader's computing device 110 and servers 106, 112 are communicatively coupled to a network 104, for example via a network interface 248 or modem 247 as described below in conjunction with FIG. 2. Client 102, mobile computing devices 108 and reader's computing device 110 are able to access applications and/or data on servers 106 using, for example, a web browser 352 or other client software, as described in greater detail below in conjunction with FIG. 3C.

Although FIG. 1 illustrates one client 102, two mobile computing devices 108, one reader's computing device 110 and two servers 106, 112 as an example, in practice many more (or fewer) clients 102, mobile computing devices 108, reader's computing devices 110 and/or servers 106, 112 can be deployed. In one embodiment, the network 104 is in the form of the Internet. Other networks 104 or network-based environments can be used in other embodiments.

Figure 2:
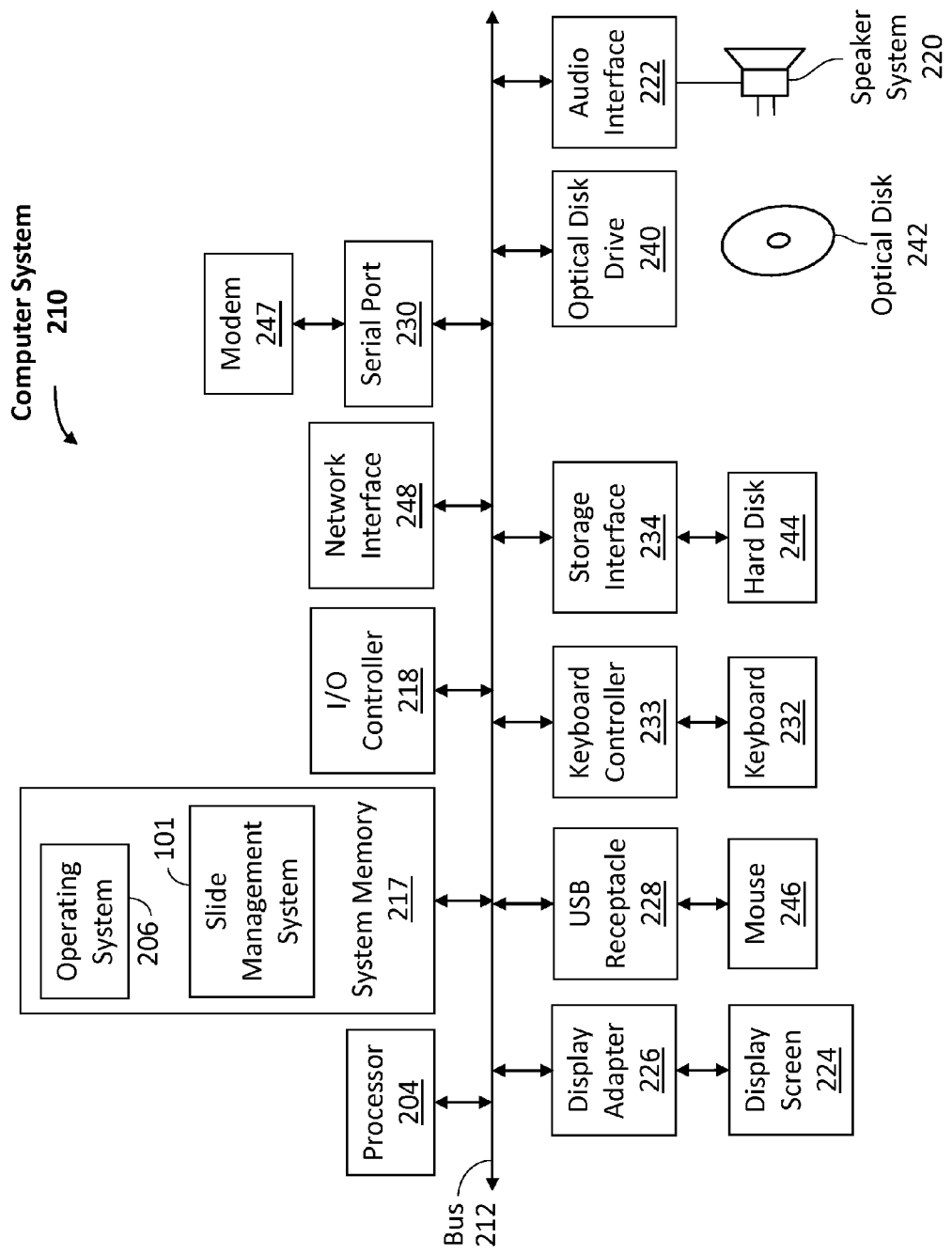
FIG. 2 is a block diagram of a computer system suitable for implementing a slide management system, according to some embodiments of the present invention.

FIG. 2 is a block diagram of a computer system 210 suitable for implementing a slide management system 101. Clients 102, mobile computing devices 108, reader's computing devices 110 and servers 106, 112 can be implemented in the form of such computer systems 210. As described in greater detail below in conjunction with FIG. 3A, a mobile computing device 108 is a type of computer system 210. As illustrated in FIG. 2, one component of the computer system 210 is a bus 212. The bus 212 communicatively couples other components of the computer system 210, such as at least one processor 204, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 204 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 204. Application programs can also be loaded into system memory 217 from a remote location (i.e., a remotely located computer system 210), for example via the network interface 248 or modem 247. In FIG. 2, the slide management system 101 is illustrated as residing in system memory 217. The workings of the slide management system 101 are explained in greater detail below in conjunction with other figures. An operating system (OS) 206 is also depicted as residing in the system memory 217.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 104 such as the Internet. Such coupling can be wired or wireless.

Figure 3A:
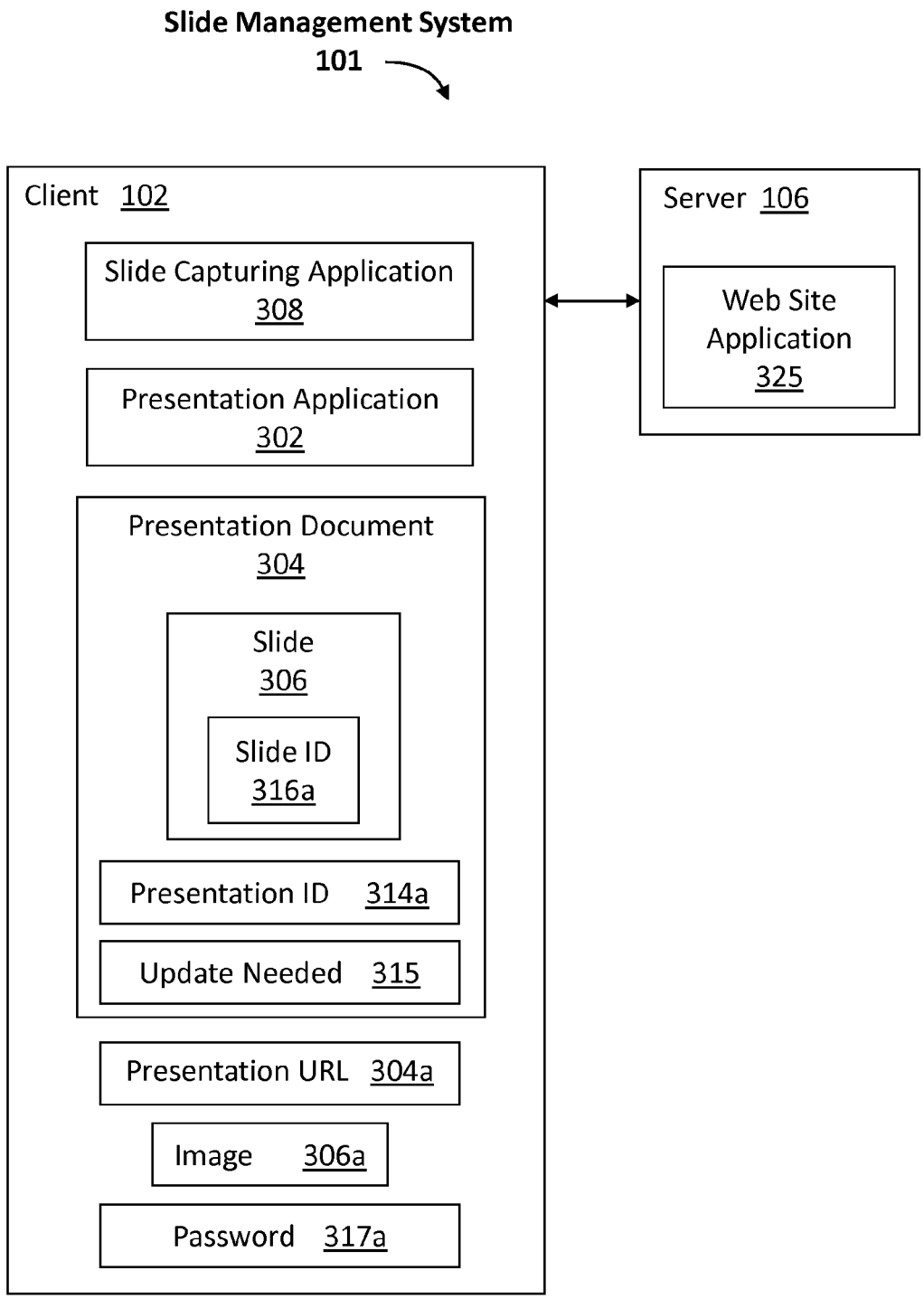
FIGS. 3A through 3D are block diagrams depicting specific instantiations of certain features of a slide management system, according to some embodiments of the present invention.

FIG. 3A illustrates the operation of a slide management system 101, according to some embodiments. It is to be understood that the slide management system 101 represents a collection of functionalities, which can be instantiated as a single or multiple components as desired. It is to be understood that the slide management system 101 and components thereof can be instantiated (for example as object code or executable images) within the system memory 217 (e.g., RAM, ROM, flash memory) of any computer system 210, such that when the processor 204 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. In some embodiments, components of the slide management system 101 can be instantiated in whole or in part on one or more mobile computing devices 108. As used herein the term "mobile computing device" means a computer system 210 that can be practicably moved between and used in different physical locations. Examples of mobile computing devices 108 include but are not limited to smartphones, personal digital assistants, tablet computers, laptop computers, etc.

Additionally, program code to implement the functionalities of the slide management system 101 can be stored on computer-readable storage media. Any form of non-transitory computer readable storage medium can be used in this context, such as magnetic or optical storage media. As used herein, the term "computer readable storage medium" does not mean an electrical signal separate from an underlying physical medium.

FIG. 3A illustrates a high level overview of the operation of a slide management system 101, according to some embodiments of the present invention. As illustrated in FIG. 3A, a slide capturing application 308 of the slide management system 101 runs on a client 102, and a web site application 325 of the slide management system 101 runs on a server 106. It is to be understood that the illustrated distribution of the functionalities of the slide management system 101 is an example only, and in different embodiments the various components of the slide management system 101 can be instantiated on one or more client(s) 102 and or server(s) 106, and be distributed in other ways as desired. As illustrated in FIG. 3A, a presentation application 302 runs on the client 102. The presentation application 302 is operated by a presenter. It is to be understood that in embodiments in which the presenter is making a server 106 based presentation, the presentation application 302 can run on a server 106. The presentation application 302 can be in the form of a conventional presentation application such as PowerPoint® or the presentation component of Google Docs®. The presenter uses the presentation application 302 to present a presentation document 304 to an audience. The presentation document 304 is in the format utilized by the presentation application 302 (e.g., a .ppt or .pptx file in the case of PowerPoint®). The presentation document 304 comprises multiple slides 306 in a specific sequence.

The slide capturing application 308 captures individual slides 306 of the presentation document 304. In some embodiments, this slide capturing functionality is instantiated as an add-in to the presentation application 302, although in other embodiments the slide capturing functionality is instantiated in other ways, such as a standalone executable image or script. The slide capturing application 308 reads the presentation document 304, and creates a separate slide object for each slide 306 of the presentation. In some embodiments, each slide object is in the form of an image 306a of the corresponding slide 306, as illustrated in FIG. 3A. In such embodiments, the images may be in any image format, such as JPEG, PNG, TIFF, GIF, bitmap, PDF, etc. In other embodiments, a slide object can be in other formats, such as markup language or another type of data description of the visual content of the slide 306. Where the term "slide image" is used herein, it is to be understood that in other embodiments, other instantiations of slide objects can be used instead.

In one embodiment, the slide capturing application 308 also creates a presentation ID 314a identifying the presentation contained in the presentation document 304, and a separate slide IDs 316a identifying each one of its slides 306. In some embodiments, the presentation ID 314a and slide IDs 316a are created on the server 106 and transmitted to the client 102, as discussed below in more detail conjunction with FIG. 5. The slide capturing application 308 associates the presentation ID 314a with the presentation document 304, and each slide ID 316a with its specific slide 306. These associations can be made, for example, by storing the identifiers as tags to, meta-data to, or hidden content embedded in the presentation document 304 and slides 306.

As the presenter cycles through the presentation, the current slide 308 is displayed on a projection system 103 (or the display screen 224 of the computer 210 being operated by the presenter). In embodiments in which the presentation application 302 runs on a client 102, the slide images 306a are uploaded to server 106 (either all at once at the beginning of the presentation, or as the presenter cycles through the slides 306), and current slide information is communicated to the server (for example by transmitting a control signal when the presenter changes slides 306).

As discussed in greater detail below in conjunction with FIG. 3B, the web site application 325 on the server side maintains a presentation Universal Resource Locator (URL) 304b, which is the location within the network 103 of the image 306b of the current slide 306 being presented. The server 106 can transmit a copy of the presentation URL 304a to the client 102. In one embodiment, the slide capturing application 308 displays the current presentation URL 304a in conjunction with the current slide 306 (e.g., at any suitable location on the display screen 224 on which the slides 306 of the presentation are being displayed) so that members of the audience can initiate the display of the presentation on a personal mobile computing device 108, such as a smartphone. As described in more detail below, the presenter can toggle the display of the presentation URL 304a off, so as not to distract from the display on the projection system 103 once those audience members who want to have initiated the presentation on their personal devices 108. The presenter can also toggle the display of the presentation URL 304a on, in case an audience member requests it, for example mid-presentation.

As explained in greater detail below, the slide capturing application 308 keeps track of whether the presentation document 304 has changed since its images 306 were last uploaded to the server 106. The slide capturing application 308 can keep track of this, for example, by maintaining a Boolean variable (called update needed 315 in conjunction with FIG. 3A) in system memory 217 of client 102. Update needed 315 is set to "true" if its corresponding presentation document 304 changed since images 306 of it were last uploaded to server 106, and it is set to "false" otherwise.

As explained in more detail below, password protection can optionally be implemented, in which case a password string variable (called password 317a in conjunction with FIG. 3A) is present in system memory 217 of client 102. It stores a password string that the presenter enters at the beginning of a presentation to control and limit the online audience. If password 317a is empty (or non-existent), the presentation show is not password-protected.

It is to be understood that one or more presenters can make one or more presentations from one or more clients 102 (and/or servers 106 as discussed in more detail below in conjunction with FIG. 10).

Figure 3B:
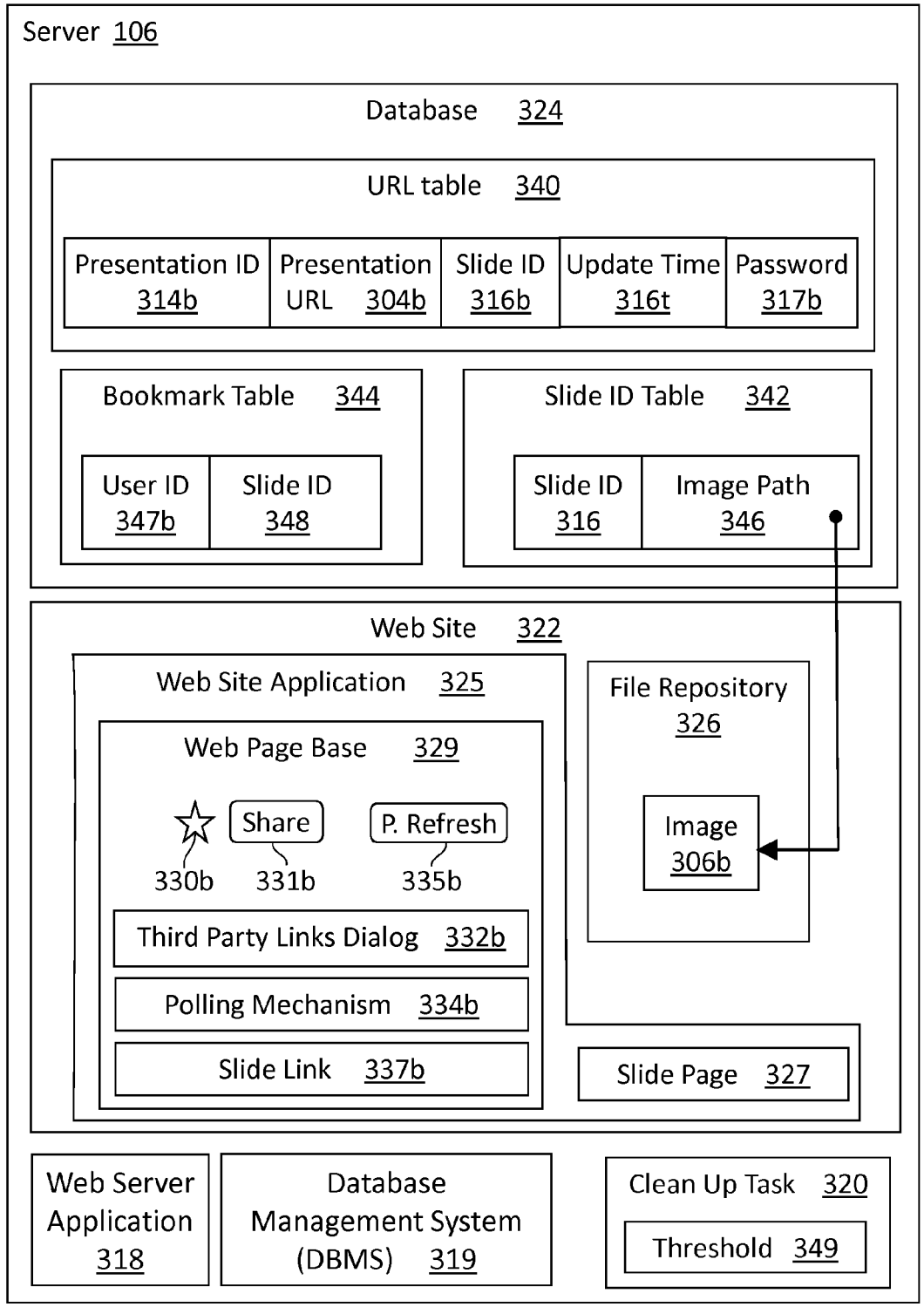

FIG. 3B depicts an example of a configuration of a server 106, according to some embodiments. On the server 106 is a Web server application 318, a database management system (DBMS) 319, a clean up task 320, a Web site 322, and a database 324. Web site 322 includes a Web site application 325 and a file repository 326. For example, the set Linux®, Apache®, cron task, MySQL™ and Drupal® is an exemplary embodiment of the set OS 206, Web server application 318, clean up task 320, DBMS 319 and Web site application 325. These are only examples that can be used in one embodiment. In other embodiments, different operating systems 206, Web server applications 318, clean up tasks 320, data base management systems 319 and Web site applications 325 are used. It is to be understood that server side functionality of the slide management system 101 is described herein as being executed by Web site application 325. In some embodiments, a framework suitable for Web site applications such as Drupal® is configured to implement this functionality, whereas in other embodiments this functionality is implemented in other ways, for example as a standalone application or script.

Web site application 325 includes a slide page 327 and a Web page base 329. Example user interface components are illustrated in the form of a bookmark button 330b, a share button 331b, a third-party links dialog 332b, a polling mechanism 334b, a page refresh 335b, and a slide link 337b linking to slide page 327. Other or different buttons, dialogs, mechanisms, links or other user interface components can be used to achieve the same functionality in other embodiments. Some embodiments do not use the functionality associated with the polling mechanism 334b, page refresh 335b, and/or slide link 337b. These functionalities are described in more detail below. As described in more detail below, multiple users can interact with Web site application 325. Each user is identified by a unique user ID 347. Users can login using conventional login functionality. In some embodiments, logging in requires a password 317.

Web server application 318 delivers content of Web site 322 to clients 102 and mobile computing devices 108 over network 104.

Bookmark button 330b and share button 331b (or other user interfaces components) allow respectively to bookmark and to share with others in real time an image 306b of a specific slide 306 added to Web page base 329, for example as depicted in and described in conjunction with FIGS. 7C-9B below. In some embodiments, bookmark button 330b (depicted, for example, in the shape of a star icon in FIG. 3B) can be toggled between "on" and "off". For example, the star can be yellow when "on" and white when "off" (these are just examples of graphical indicia indicating whether the functionality associated with the user interface component is available). It can be set to "off" in Web page base 329. When a user selects (e.g., clicks) an active bookmark button 330b, a control signal is generated indicating that the user wishes to bookmark the slide 306 currently being presented, such that the user can access that individual slide 306 later.

In some embodiments, web site 322 implements account association with accounts at one or more third-party sites 338 (shown in FIG. 3D below) such as a social networking site. These account associations can be implemented, for example, by using conventional account association techniques for specific third party sites. For example, in an embodiment in which Web site application 325 is implemented using open source content management system Drupal® 6, the open source module suite "Drupal for Facebook" is used to associate an existing user account on Web site 322 with an existing Facebook® account. This can be done in several ways: the user can use Facebook credentials to join Web site 322, in which case the new user account created on Web site 322 is directly associated with the Facebook account. Or the user can create an account on Web site 322 and then connect the site account to a Facebook account. An exemplary embodiment of software present on third-party sites 338 is given in FIG. 3D below.

Third-party links dialog 332b is a pop-up dialog that includes one link for each third-party site 338 for which account association functionality is implemented in Web site 322. In an embodiment in which Web site 322 implements message posting by its members, a link to Web site 322 is also included in third-party links dialog 332b.

Each link is displayed as a clickable link or user interface component, with text indicating to select or click to send a message including a link to the current slide 306. When the user selects a third-party link, a message that includes a link to the slide 306 currently being presented is posted to the corresponding third-party site 338. The type of message depends on the third-party site: for example it may be a post in the case of Facebook, or a tweet in the case of Twitter®. Third-party site 338 can be identified by name, logo or a unique message type (e.g. "tweet") in or near the link text. Third-party links dialog 332b is typically hidden in Web page base 329, and is displayed when share button 331b is clicked (clicking the share button 331b generates a control signal indicating that the user wishes to share the current slide 306). If implemented, polling mechanism 334b allows the page it is in to poll Web site 322 for updates on a regular basis (e.g., every 15 seconds, every 45 seconds, every 60 seconds).

Figure 6A:
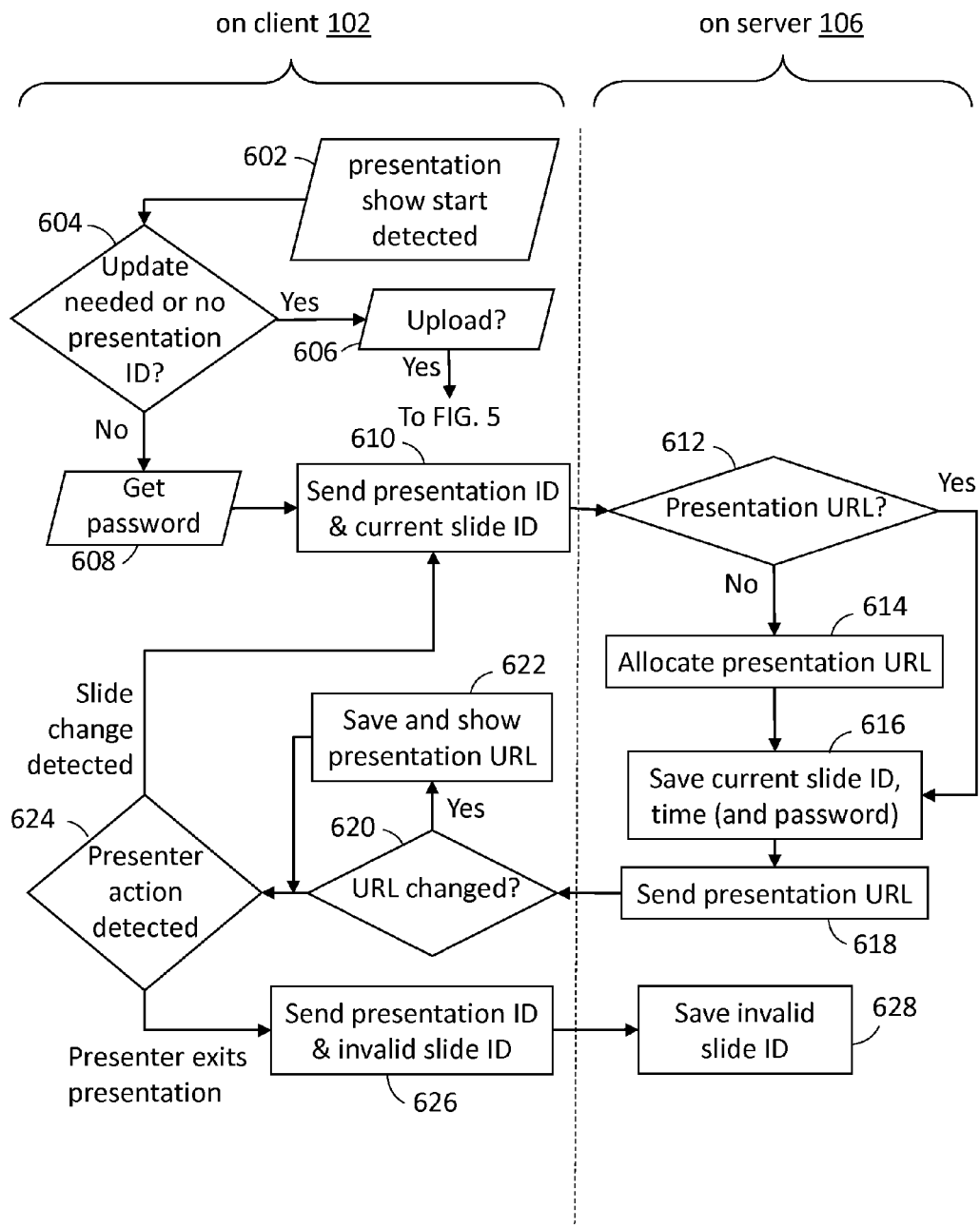
FIG. 6A is a flowchart that depicts an example of process of presentation show start, according to some embodiments of the present invention.
Figure 6B:
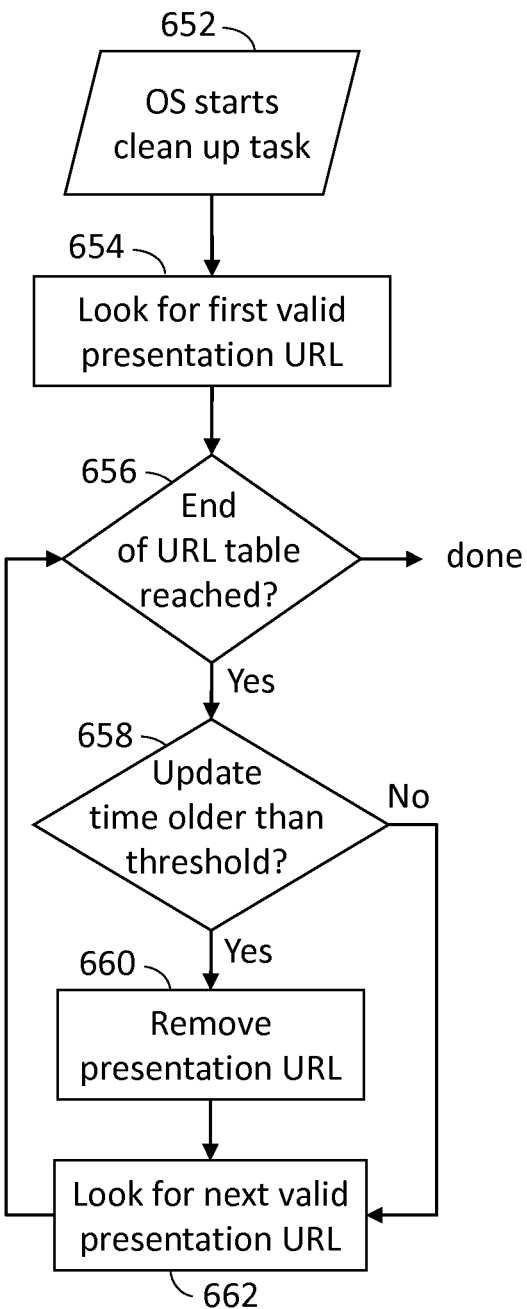
FIG. 6B is a flowchart that depicts an example of steps for de-allocation of a presentation Web address, according to some embodiments of the present invention.

Database 324 (or other suitable storage mechanism) stores a URL table 340 (or other suitable data structure) that keeps track of Web addresses or Universal Resource Locators (URLs) allocated to presentations being delivered, a slide ID table 342 (or other suitable data structure) that keeps track of images 306a associated with slide IDs, and a bookmark table 344 (or other suitable data structure) that keeps track of slides bookmarked by logged in users. Each record of URL table 340 typically includes a presentation ID 314b and a presentation URL 304b. Presentation ID 314a (FIG. 3A) is a client copy of presentation ID 314b made during the image upload process. Presentation URL 304a (FIG. 3A) is a client copy of presentation URL 304b made at the start of a presentation show (an example of this process is depicted in FIG. 6A below). Presentation URL 304b is cleared by clean up task 320 after termination of the presentation show (an example of this process is depicted in FIG. 6B below).

Each presentation ID 314b is unique within URL table 340. A presentation ID 314b can be set as an automatically generated primary key to guarantee uniqueness. Other mechanisms resulting in a unique ID can also be used.

In an embodiment in which password protection is implemented, each record of URL table 340 also includes a password 317b, copy of password 317a made during communication between client 103 and server 106, as illustrated for example in the steps of FIG. 6A.

In one embodiment, a mechanism can be implemented to let the presenter choose whether members of the audience can share images of slides or not. This can be implemented with an added Boolean sharing control field (not shown) to presentation URL table 340.

File repository 326 includes images 306b, copies of images 306a of slides 306 obtained by upload from client 103 to server 106 (an example of image upload process is given in FIG. 5 below).

Each record of slide ID table 342 includes a slide ID 316 and an image path 346 that describes the location on server 106 of image 306b, image of slide 306. Each slide ID 316 is unique within slide ID table 342, and can be set as an automatically generated primary key to guarantee uniqueness. Slide ID 316 uniquely identifies slide 306.

A copy of slide ID 316a, called slide ID 316b in FIG. 3B, and the time of the copy, called update time 316t in FIG. 3B, are placed in the record identified by presentation ID 314b in URL table 340 when slide 306 is presented, as depicted in FIG. 6A below. Image 306b of slide 306 identified by slide ID 316b can be obtained by searching for the record with slide ID 316 field value equal to slide ID 316b, in slide ID table 342. Image path 346 of the same record gives the location of image 306b.

Web site application 325 creates and displays slide page 327 when an URL request for slide ID 316b within Web site 322 is made (e.g., an URL request of the type: URL of Web site 322/slide ID 316b). Web site application 325 uses slide ID 316b as a key to locate image path 346 in slide ID table 342, and copies image 306b found at that path, on slide page 327. Slide page 327 can also include headers, footers, links, formatting and graphics used in other parts of Web site 322.

Each record of bookmark table 344 includes a user ID 347b and a slide ID 348. Each user registered on Web site 322 is associated with a unique user ID 347b. Each user ID 347b-slide ID 348 pair indicates that the slide 306 with the given slide ID 348 is bookmarked by the user with the given user ID 347b.

Clean up task 320 contains a time threshold, or threshold 349. Clean up task 320 is responsible for removing presentation URLs from URL table 340 when their update time 316t is older than current time minus threshold 349. The value to use for threshold 349 is a variable design parameter, and different values can be used in different embodiments (e.g., 3 hours, 24 hours, 48 hours, etc.). An example of clean up steps is given in FIG. 6B below.

In one embodiment, Web site application 325 makes a smaller copy of image 306b, called image 306bb herein (not shown) to send to mobile devices 108 with small display screens 224. In this case, image 306bb also resides in file repository 326 and an image path to image 306bb is added to the record identified by slide ID 316 in slide ID table 342.

In some embodiments, file repository 326 is located on another server 106 (not shown) connected to server 106. In addition or instead, DBMS 319 and database 324 may be located on another server 106 (not shown) connected to server 106.

Optionally, presentation browsing data and mechanism can be added to allow browsing through images of presentation document 304: for example a first slide ID 350 (not shown) capturing the slide ID of the first slide of each presentation can be added as an extra field to the records of URL table 340. Also, in slide ID table 342, a next slide ID 351 (not shown) can be added to the record described by presentation ID 314b, and hold a copy of the slide ID of the slide following slide 304, in presentation order. Next slide ID 351 should be set to an invalid value for the last slide of each presentation.

As part of optional presentation browsing data and mechanism, "next" and "previous" links can be added to slide page 327 to display respectively the next and previous images in presentation order. When slide page 327 displays image 306b (associated with slide ID 316), the destination of the "next" link is next slide ID 351, and the destination of the "previous" link is the value of the slide ID field of the record of slide ID table 342 for which slide ID 316 is found in the next slide ID 351 field.

Figure 3C:
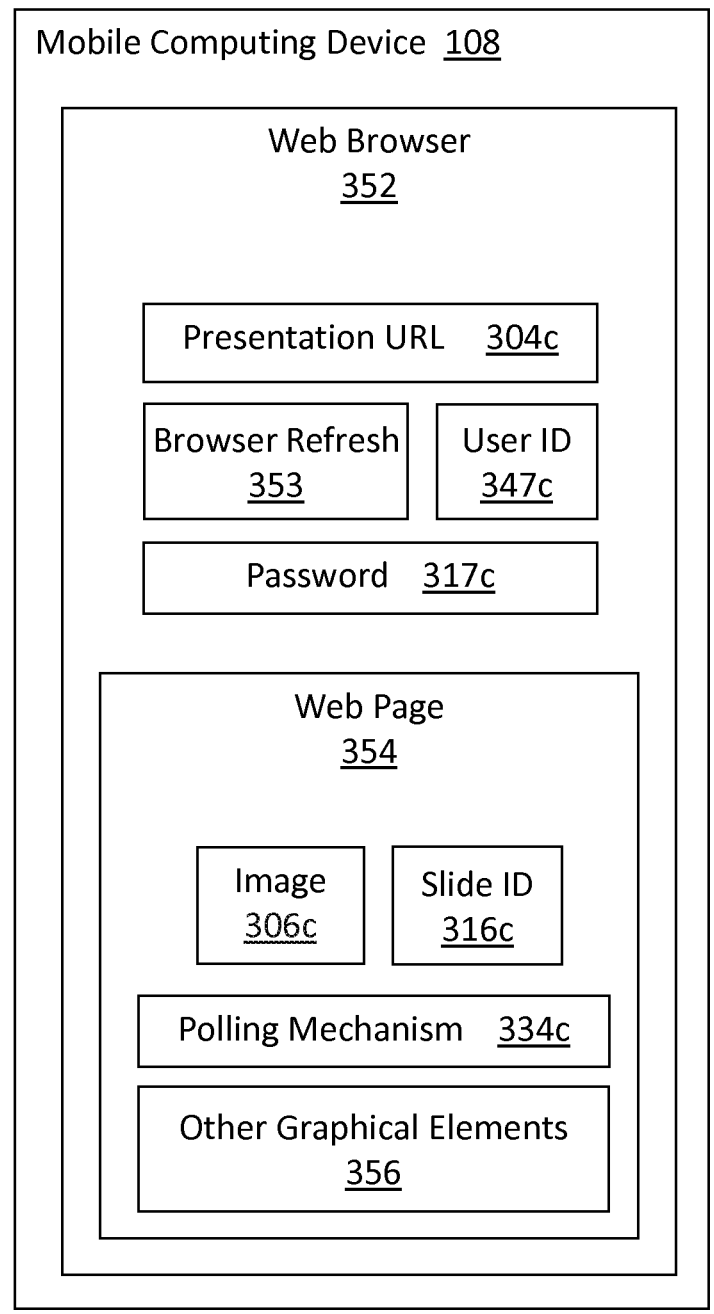

FIG. 3C depicts an example of a configuration of a mobile computing device 108, according to some embodiments. On the mobile computing device 108 is a Web browser 352, which includes a browser refresh button 353, a presentation URL 304c and a Web page 354. Presentation URL 304c, a mobile device level copy of presentation URL 304b, is the address of Web page 354 on network 104. Web page 354 contains a slide ID 316c and an image 306c, copies of slide ID 316b and image 306b sent by Web site application 325 to Web browser 352 in response to its request for presentation URL 304c (exemplary steps are described in FIGS. 7A through 7C below).

Web page 354 includes a copy of Web page base 329, and therefore includes optionally a polling mechanism 334c, copy of optional polling mechanism 334b. Web page 354 contains other graphical elements 356 described in FIG. 4 below.

If a user is logged in to Web site 322 within Web browser 352, Web browser 352 also includes a mobile device level user ID 347c, for example in the form of a browser cookie. A unique user ID 347 is associated with each registered user of Web site 322. Therefore, one server level user ID 347b corresponds uniquely to one mobile device level user ID 347c.

Optionally, if password protection is implemented, a password string or password 317c is also present in Web browser 352. If the presentation is password protected and the user the mobile device 108 is not logged in, the user is requested to log in using password 317c. It is to be understood that mobile device side functionality of the slide management system 101 is described herein as being executed by Web browser 352. Typically, a conventional Web browser 352 is configured to execute this functionality. It is to be further understood that in some embodiments, the functionality described herein as being provided on a mobile computing device 108 is provided on a different type of computer 210 such as a desktop.

Figure 3D:
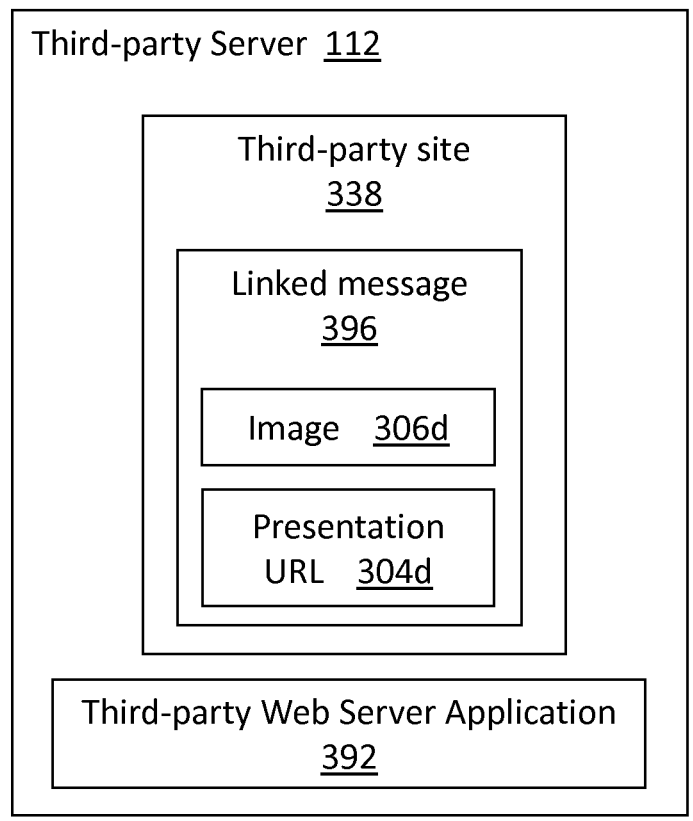

FIG. 3D depicts an example of a configuration of a third-party server 112, according to some embodiments. As the term is used herein, a third-party server 112 is a server computer operated by a party other than a presenter or a viewer of a presentation, such as a social networking site (e.g., Facebook, Twitter) used to share slides 306 of a presentation according to some embodiments of the present invention. On the third-party server 112 is a third-party Web server application 392 and third-party site 338, which includes a linked message 396. The destination URL of the link of linked message 396 is slide ID 316b on Web site 322. Optionally, linked message 396 includes a presentation URL 304d, a copy of presentation URL 304b. Optionally, linked message 396 includes an image 306d, full-size or scaled-down copy of image 306b. The link(s) in linked message 396 and the image 306d may not display on some readers devices 110 that do not support links or images (for example Twitter messages received as text messages on some low-end cell phones).

Figure 4:
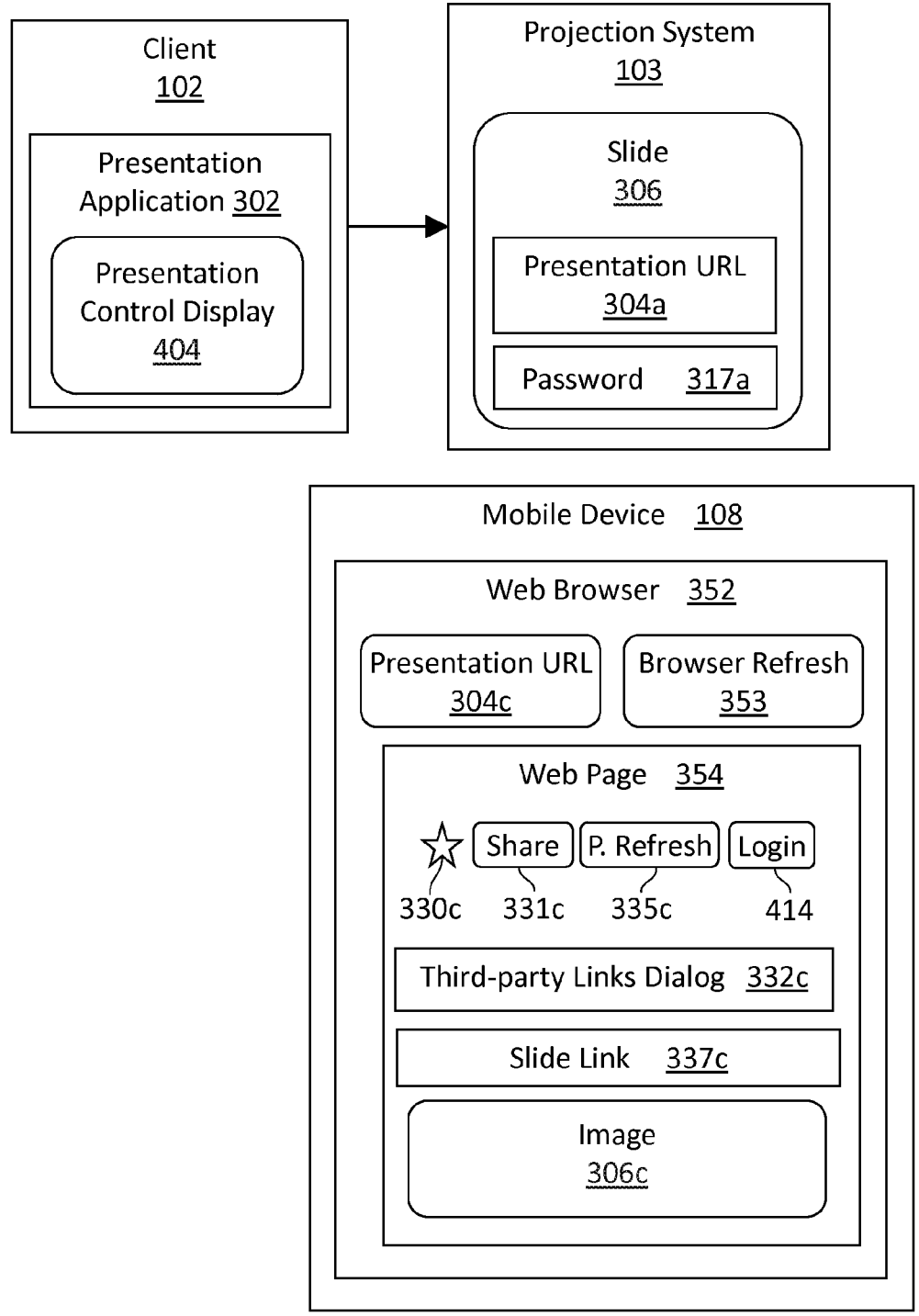
FIG. 4 is a block diagram that depicts exemplary visual elements of some embodiments of the present invention.

FIG. 4 depicts an example of visual elements displayed on client 103, projection system 103 and mobile devices 108 during a live presentation show. Projection system 103 displays slide 306, and presentation URL 304a, so the audience of the live presentation can read the address to enter in Web browser 352 of their mobile device 108 to view and further interact with images 306b and presentation document 304. Optionally, if password protection is implemented and the presenter has entered a non-null password 317a for the presentation, password 317a is also displayed on top of slide 306.

In other embodiments, presentation URL 304a (and password 317a where implemented) can be communicated to the audience by other means, for example by audio or videoconference or through email. Audience members unable to see projection system 103 (including in cases when projection system 103 is not implemented) may then see images of the slides of the presentation on their mobile devices 108, and may hear the presenter via, for example, an independent audio conference. In embodiments in which projection system 103 is not implemented, slides 306, presentation URL 304a, and optionally password 317a, are displayed to the presenter via display screen 224.

In one embodiment, presentation URL 304a is displayed as a bar code image that the presenter can toggle to full screen on projection system 103, and that members of the audience can scan by pointing their mobile device 108 towards the projection system 103 and using a bar code scanner, and then browse to presentation URL 304a in one click. For example, mobile devices that run the GOGGLE® ANDROID® operating system include a barcode scanner. Popular bar codes used for encoding Web site addresses include, for example, Quick Response (CR) codes.

The presenter operates the presentation application 302 by entering presentation control instructions such as "next slide", "previous slide" and "stop presentation". Slide capturing application 308 can capture the event of the presenter inputting a specific command not assigned by presentation application 302 (the key "1", for example), referred to as "Toggle Event", and uses this Toggle Event to toggle the display of presentation URL 304a (and password 317a where implemented) on the projection system 103.

Optionally, presentation application 302 may display a presentation control display 404 on personal display screen 214, to provide information to assist the presenter (for example, where client 103 is a laptop computer). For example, presentation control display 404 may display slide 306, other slides of presentation document 304, clickable presentation navigation icons, presentation notes, presentation duration, etc. Optionally, slide capturing application 308 adds to control display 404 an icon that triggers the Toggle Event when clicked.

As noted above, Web browser 352 on mobile devices 108 includes presentation URL 304c, browser refresh 353 and Web page 354. Presentation URL 304c can be entered manually by the user of mobile device 108, for example after seeing URL 304a displayed on projection system 103. Alternatively, Web page 354 may open after user click on an electronic message containing a link to presentation URL 304c, or after scanning a bar code displayed on projection system 103 or on another mobile device 108. Presentation URL 304c is therefore a copy of presentation URL 304a.

Optionally, a bar code of presentation URL 304c is also displayed on Web page 354, optionally with a way to toggle it to full screen, so presentation URL 304c can be shared among audience members in a simple and fast way.

Web page 354 is a copy of Web page base 329, and therefore can include a bookmark button 330c, a share button 331c, a hidden third-party links dialog 332c, a page refresh 335c, and a slide link 337c, respectively copies of bookmark button 330b, share button 331b, hidden third-party links dialog 332b, page refresh 335b and slide link 337b. In addition, Web page 354 includes an image 306c, image of slide 306 being presented.

For users not logged into Web site 322 within browser 352, the content of Web page 354 includes in addition a login/join button 414 (or other user interface component).

Figure 5:
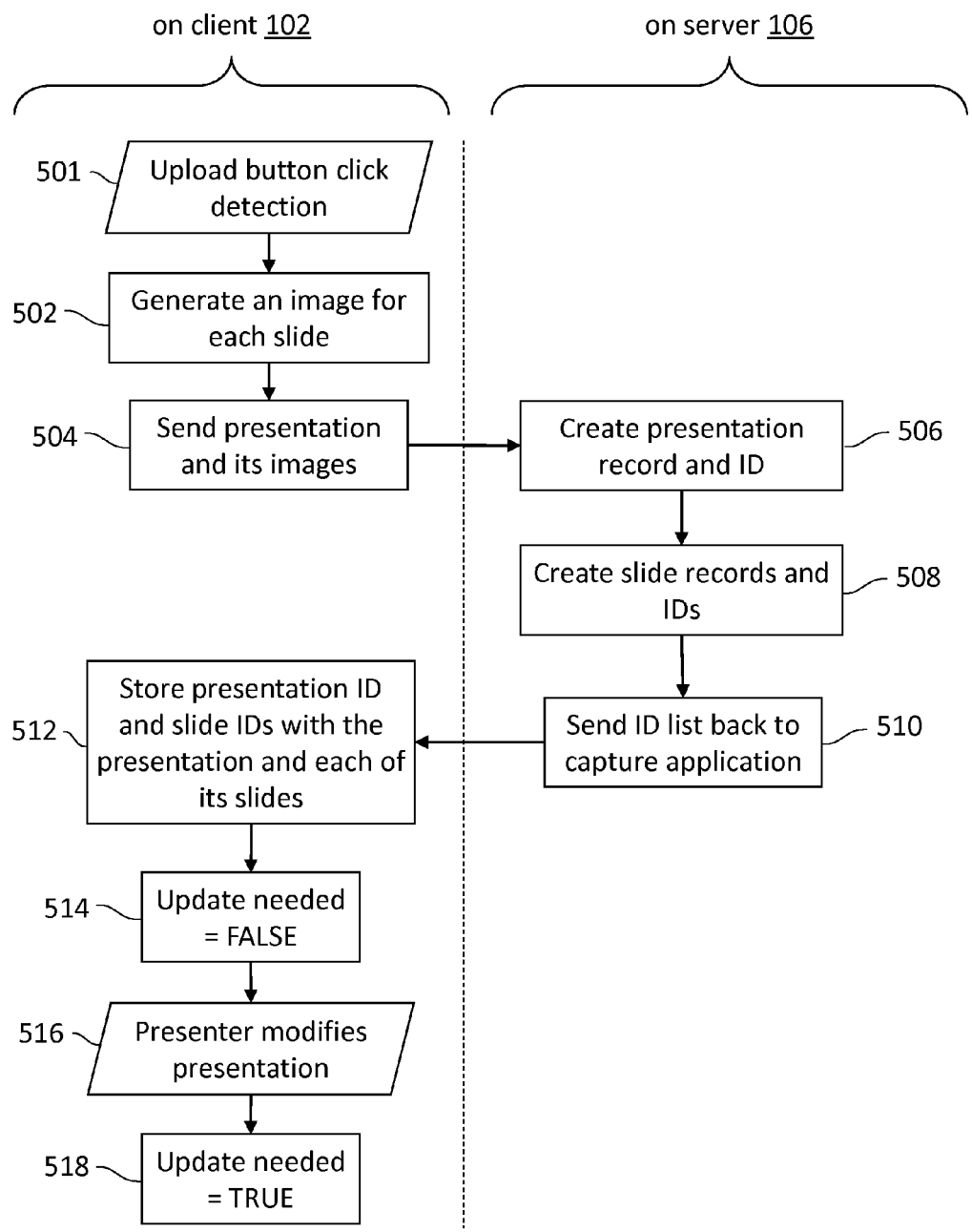
FIG. 5 is a flowchart that depicts an exemplary process of image upload, according to some embodiments of the present invention.

FIG. 5 is a flowchart that depicts an exemplary process of image upload from client 103 to server 106, according to one embodiment. In a first step 502, slide capturing system application 308 requests from presentation application 302 the generation of an image 306a for each slide 306 of presentation document 304. For example, in an embodiment in which presentation application 302 is Microsoft PowerPoint® and slide capturing application 308 is instantiated in the form of an add-in to PowerPoint®, part of the instruction to request the generation of image 306a in PNG format can be: Slides (i).Export Filtername:="PNG", where "i" is the slide number.

The image size to request may be adjusted depending on the size of the display area of target mobile devices 108, communication bandwidth constraints, the size of the presentation document 304, or any combination thereof. For example, a width of roughly 600 pixels can be used for a standard definition image, and a width of roughly 300 pixels is enough in cases where a low image definition is desired. Alternatively, slide capturing application 308 may generate images 306a itself rather than requesting them from the presentation application 302.

Slide capturing system application 308 sends presentation ID 314a and its images 306a to Web site application 325 (step 504), for example as an HTTP GET request. Then, a new record is added to URL table 340 and the globally unique key (within URL table 340) returned by DBMS 319 for that new record becomes presentation ID 314b (step 506).

Then, for each image 306a, Web site application 325 creates a unique image path 346 within file repository 326 and saves image 306b, copy of image 306a, at image path 346. Also, it adds a new record to slide ID table 342, places image path 346 in it, and the globally unique key (within slide ID table 342) returned by DBMS 319 for that new record becomes slide ID 316 (step 508).

Then, Web site application 325 sends presentation ID 314b and all associated slide IDs 316 back to slide capturing application 308 (step 510). As part of the data communication and transfer, presentation ID 314b is copied into presentation ID 314a and all slide IDs 316 are copied into slide IDs 316a on client 103. Then, slide capturing application 308 stores presentation ID 314a and each slide ID 316a with presentation document 304 and each slide 306, respectively (step 512).

Then, slide capturing application 308 sets update needed 315 to false (step 514). Then, slide capturing application 308 detects if the presenter modifies presentation document 304 (step 516), in which case it sets update needed 315 to true (step 518). In another embodiment, update needed 315 is not implemented, the steps of FIG. 5 terminate after step 512, and the detection of modification to presentation document 304 is performed in step 604 below instead of a check of update needed 315.

FIG. 6A is a flowchart that depicts an example of process of presentation show start. In a first step 602, slide capturing application 308 detects that a presentation show is started on slide 306. Then, a test is performed (step 604): if presentation document 304 does not have a presentation ID 314a, or if update needed 315 is true, a dialog is shown to the presenter asking to upload the presentation (step 606). If the presenter agrees to the upload, the steps of FIG. 5 are then followed. If not, the steps terminate here.

Alternatively, step 606 is skipped and the steps of FIG. 5 are without prompting the presenter.

If the conditions of step 606 are not met in step 604, presentation document 304 has a presentation ID 314a and update needed 315 is false. This means that no presentation update has occurred since the steps of FIG. 5, and therefore each slide ID 316a is associated with a different slide 306 at this point.

Optionally, if password protection is implemented and the conditions for step 606 are not met in step 604, a dialog opens with a password request, and password 317a is captured (step 608). Then, slide capturing application 308 sends a copy of presentation ID 314a, called presentation ID 314bb, a copy of password 317a called password 317b, and slide ID 316b, copy of slide ID 316a, to Web site application 325 (step 610). As 314bb is a copy of 314a, and 314a is a copy of 314b (step 510 of FIG. 5), 314b equals 314bb.

If password protection is not implemented and the conditions for step 606 are not met in step 604, step 610 comes next. In this case, step 610 does not include any password copying or sending.

At this point, image 306a is an image of slide 306 (per step 502), image 306b is a copy of image 306a associated with the record including slide ID 316 and image path 346 (per step 508), and slide ID 316 equals slide ID 316a (per step 510). Also, slide ID 316b equals slide ID 316a (per step 610). Therefore, in FIG. 3B, slide ID 316b equals slide ID 316, and image 306b is an image of slide 306 of FIG. 3A.

Optionally, in the case presentation document 304 includes a presentation ID 314a and update needed 315 is set to true, an option is offered to the presenter to start the show anyway. If the presenter selects this option step 610 comes next, otherwise step 606 comes next.

Optionally, if sharing 345 is implemented, the choice of letting the audience share slides or not is captured (e.g., in the dialog of step 608 or another dialog). The sharing choice is then sent to Web site application 325 as part of step 610.

Then, Web site application 325 (FIG. 3B) checks whether the record identified by presentation ID 314b in URL table 340 has a valid presentation URL 304b (step 612). If it does not, it allocates one (step 614), preferably a very simple path on Web site 322, for example a number with two or three digits, large enough to accommodate the maximum total number of live presentations that Web site 322 may support concurrently.

Presentation URL 304b hereby allocated is unique among all presentation URLs in URL table 340: this can be achieved for example by iterative check for the smallest available number within a set of numbers, or by iterative random number generation and check for uniqueness, or through the use of a managed collection of URLs that are re-assigned as needed. After step 614, Web site application 325 places slide ID 316b into the record of URL table 340 identified by presentation ID 314b, and places the current date and time in update time 316t of the same record (step 616).

Optionally, if password protection is implemented and is part of the message received from slide capturing application 308 in step 612, password 317b is placed in the same record. Optionally, if sharing 345 is implemented and the presenter's sharing choice is part of the message received from slide capturing application 308 in step 612, the presenter's sharing choice is placed into sharing 345 of the same record.

Then, Web site application 325 sends presentation URL 304b to slide capturing application 308 on client 103 (step 618). Then, slide capturing application 308 performs a test (step 620): if presentation URL 304a is different from presentation URL 304b, it replaces current presentation URL 304a by a copy of presentation URL 304b and displays the new presentation URL 304a on projection system 103 if it is present, or on personal display screen 214 otherwise (step 622).

The presenter can hide and show the display of presentation URL 304a by using the Toggle Event mentioned in the description of FIG. 4 above.

Then, slide capturing application 308 performs a test (step 624): if it detects a slide change, step 610 comes next; otherwise, if it detects an exit from the presentation show, the steps of FIG. 6A terminate, or optionally instead it sends an invalid value (instead of slide ID 316a) together with presentation ID 314a to Web site application 325 (step 626), and then Web site application 325 saves the invalid slide ID in slide ID 316b of the record of URL table 340 identified by presentation ID 314b if found (step 628), and then the steps of FIG. 6A terminate. As a result, mobile devices 108 will stop showing the last slide presented faster than if step 626 is not taken. An invalid slide ID is a number outside the range of possible numbers in the creation of slide IDs of slide ID table 342: for example if slide IDs are generated automatically as a key field for slide ID table 342, a negative number would be invalid in a typical implementation of DBMS 319.

FIG. 6B is a flowchart that depicts removing presentation URLs from URL table 340, according to one embodiment. Clean up task 320 is triggered by OS 206 of server 106 on a regular basis, for example once per day (step 652). Then clean up task 320 looks for the first valid presentation URL 304b in URL table 340 (step 654).

Then a test is performed (step 656): if the end of URL table 340 is reached, the steps of FIG. 6B terminate here. Otherwise, a test is performed (step 658): if update time 316t is older than current time minus threshold 349, presentation URL 304b is replaced by an invalid URL (step 660). Next, in all cases, clean up task 320 looks for the next valid presentation URL in URL table 340 (step 662). Then, step 656 comes next.

Figure 7A:
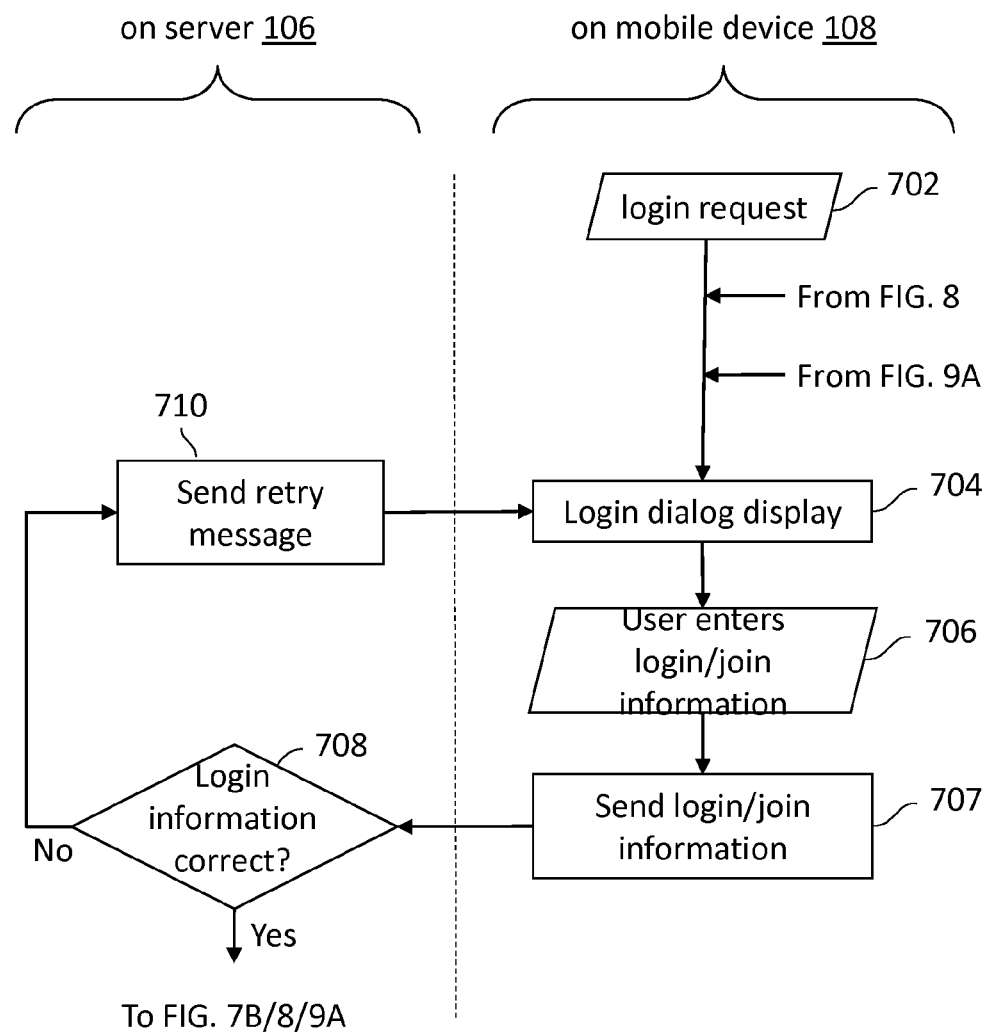
FIGS. 7A through 7C are flowcharts depicting exemplary processes leading to the display of an image of a slide being presented on the screens of devices of audience members, according to some embodiments of the present invention.
Figure 7B:
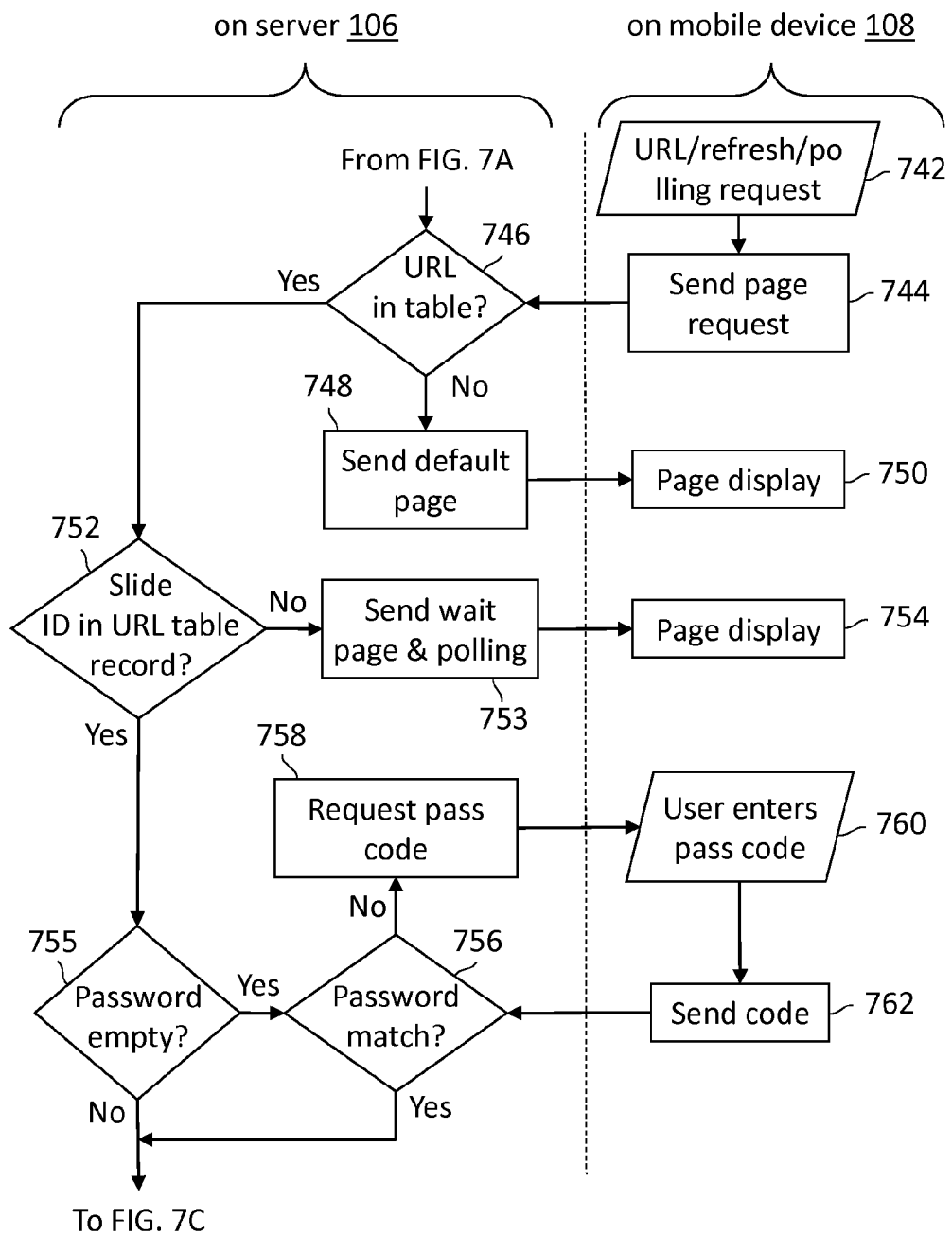
Figure 7C:
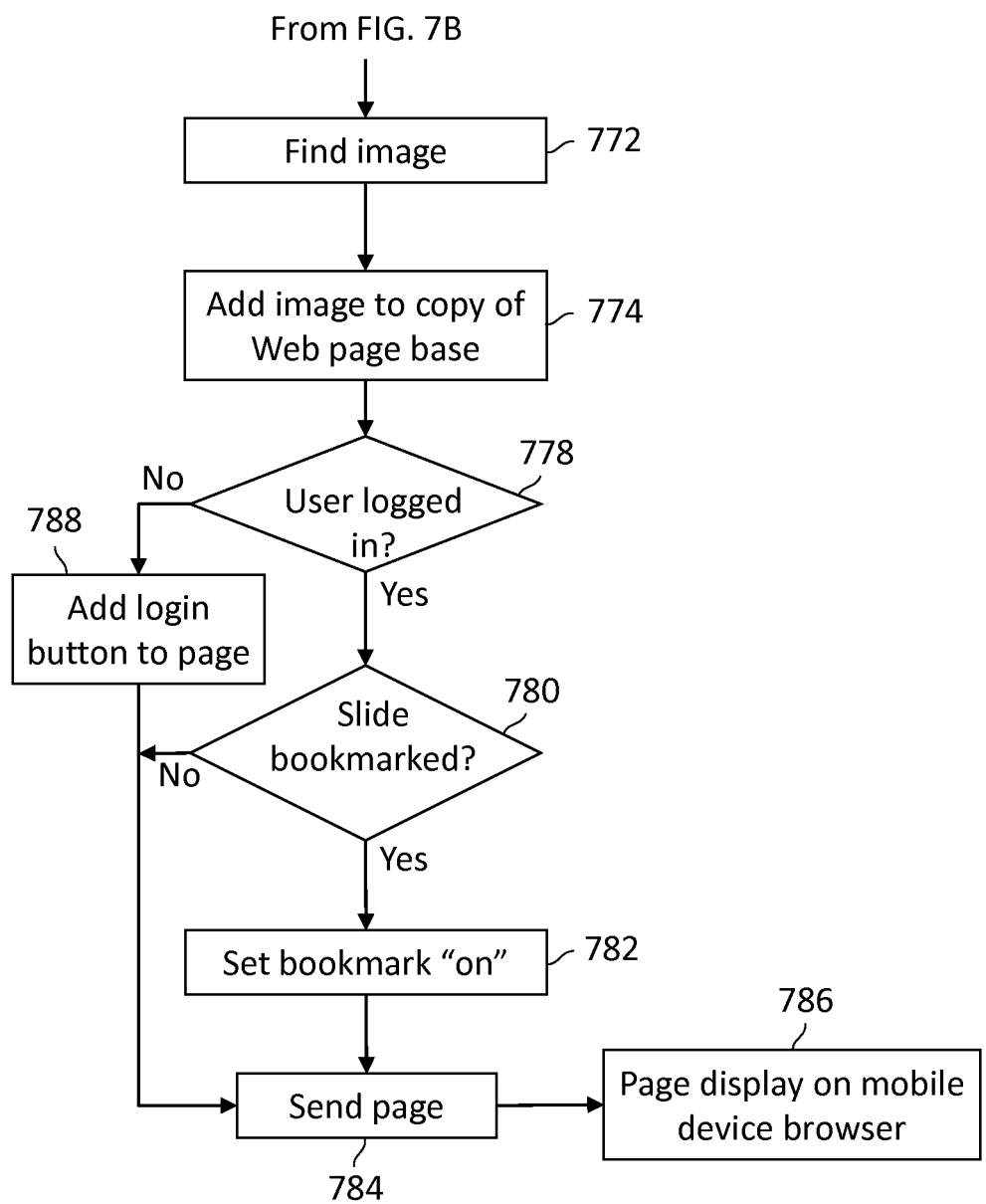

FIGS. 7A through 7C are flowcharts depicting exemplary interaction steps between Web site application 325 on server 106 and Web browser 352 on mobile device 108, leading to the display of image 306c on mobile device 108.

FIG. 7A is a flowchart that depicts an example of login process, when login button 414 is clicked. In a first step 702, Web browser 352 detects that login button 414 was clicked. Then Web page 354 shows a login/join dialog box or page (step 704). In some embodiments, the login/join page offers the option to login to or join using credentials of one or more third party sites (typically a site with social media features, for example Facebook or Twitter).

Then login or join information is captured (step 706), and sent to Web site application 325 (step 707). Then, a test is performed (step 708): if the login or join information is correct, the steps of FIG. 7B are taken next, otherwise a "retry" message is sent back to Web page 354 (step 710) and step 704 comes next.

If the user joins through a third party site, Web site 322 creates a new user account record and a new third party site information record and associates the two records. Alternatively, the user can create an account on Web site 322 and later associate the two accounts.

Figure 8:
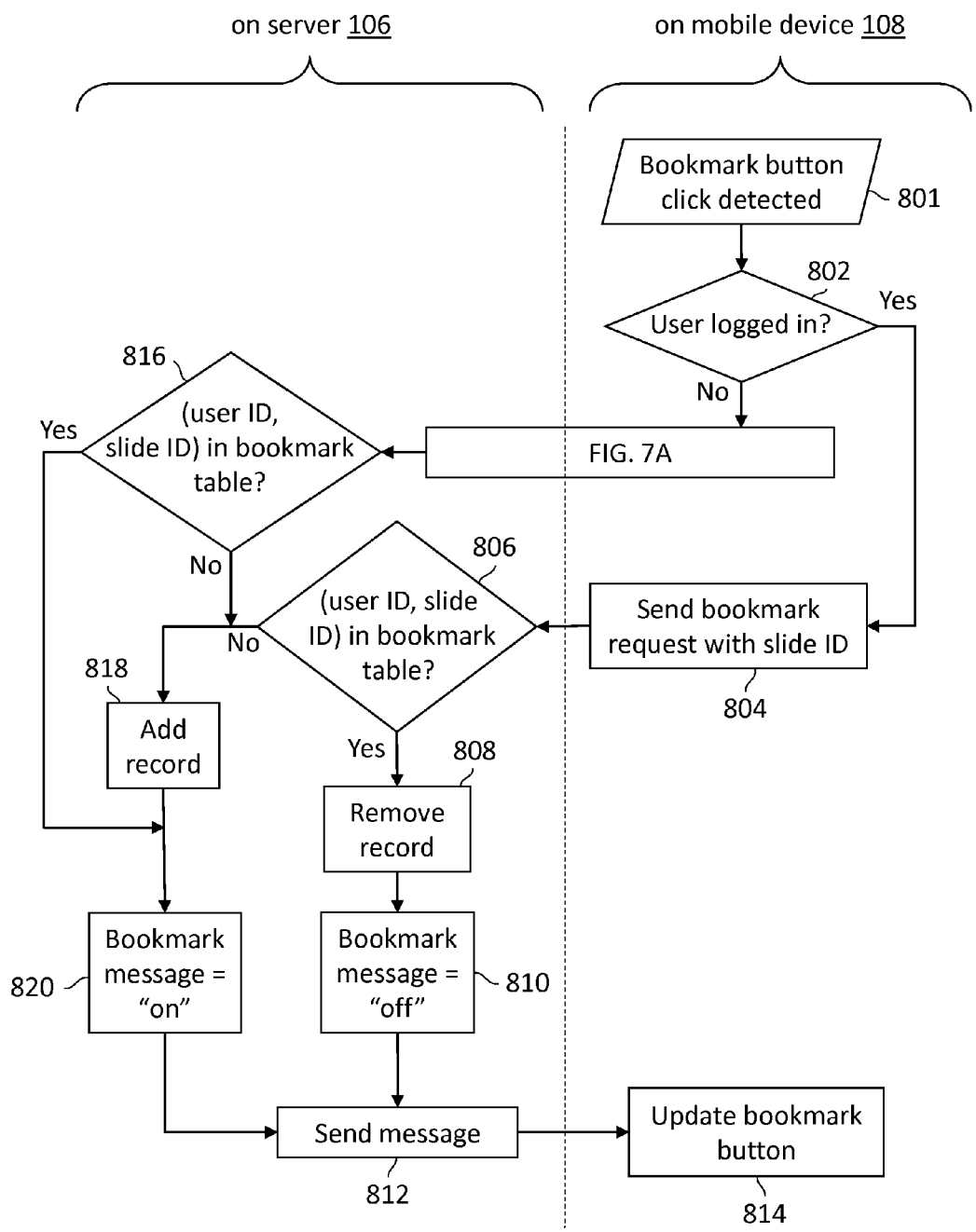
FIG. 8 is a flowchart that depicts an example of steps to toggle slide bookmarking on and off, according to some embodiments of the present invention.
Figure 9A:
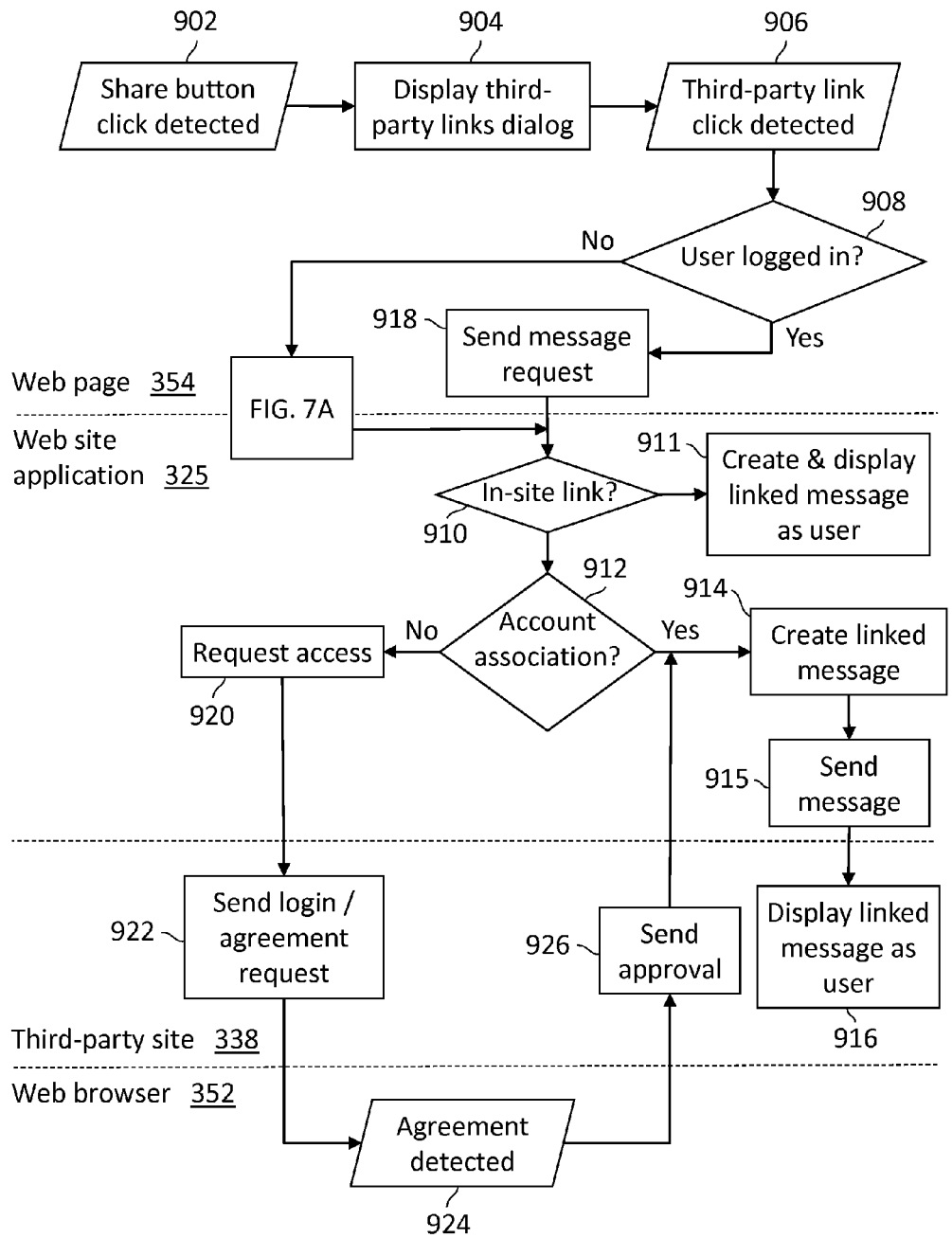
FIG. 9A is a flowchart that depicts an example of steps to share a slide being presented, according to some embodiments of the present invention.

Alternatively, if FIG. 7A is entered from FIG. 8 or FIG. 9A, the first step is 704, slide ID 316c is also sent in step 707 and if login information is correct in step 708 the steps return to the figure entered from.

FIG. 7B is a flowchart that depicts an example of checks performed on the information received by Web site 322. In a first step 742, Web browser 352 captures an URL request, or detects a click on browser refresh 353 or page refresh 335c, or optional polling mechanism 334c triggers a poll.

It is the case when members of the audience see presentation URL 304a displayed on projection system 103 or obtain it through other means (e.g., email, voice or videoconference, instant messaging, etc.), and type presentation URL 304a in the address field of Web browser 352 of their mobile devices 108. Then, Web browser 352 sends the URL request to Web site application 325 (step 744).

Then, Web site application 325 on server 106 receives the request and checks whether presentation URL 304c is present in presentation URL 304b field of a record of URL table 340 (step 746). If it is not, Web site application 325 sends back to Web browser 352 a default page stating in essence that at this time no presentation is being given on the channel requested (step 748), which Web browser 352 then displays (step 750). Step 750 can also include confirmation that the communication happened successfully, for error detection purposes. Error detection is part of conventional communication procedures, and is typically utilized in all communications exchanges described herein.

When the steps of FIG. 7B are entered from FIG. 7A, the first step is 746.

If in step 746 above presentation URL 304c is present in presentation URL 304b of a record of URL table 340, Web site application 325 then checks whether the record holds a valid slide ID in field slide ID 316b (step 752). If the slide ID is not valid, Web site application 325 sends back to Web browser 352 a wait page including a message stating in essence that the application is waiting for a slide (step 753). Then Web browser 352 displays the wait page (step 754). Optionally, the page sent back in step 753 also includes a polling mechanism, and at each regular polling time, step 742 comes next.

At the beginning of step 752, it is assumed that presentation URL 304c equals presentation URL 304b: if the user of mobile device 108 does not type the URL correctly, and it happens that the URL typed corresponds to another presentation show under way, the user will see or hear the difference between the slides presented by the presenter and the slides displayed on mobile device 108, and will re-type the URL. Since slide ID 316b is the slide ID of the record identified by presentation ID 314b and containing presentation URL 304b (per the steps of FIG. 6A above), if in step 752 above the slide ID is valid, it is slide ID 316b.

Optionally, if password protection is implemented and if in step 752 above slide ID is valid, Web site application 325 checks whether password 317b is empty (step 755): if it is empty, the steps of FIG. 7C come next. Otherwise, a test is performed (step 756): if password 317b is not empty and no password 317c was included as part of the page request from Web browser 352, a password request form is sent to Web browser 352 next (step 758).

If password 317b is not empty and a password 317c was included as part of the page request from Web browser 352, the two passwords are compared in step 756 above. If the two passwords differ, step 758 comes next, otherwise the steps of FIG. 7C come next.

After step 758, Web browser 352 receives the password request form, and the user enters password 317c as requested (step 760). Then, Web browser 352 sends password 317c to Web site application 325 (step 762) and the next step is 756.

If password protection is not implemented and if in step 752 above the slide ID is valid, the steps of FIG. 7C come next.

FIG. 7C is a flowchart that depicts an example of steps leading to the display on mobile devices 108 of the image of a slide being presented. In the specific embodiment illustrated, Web site application 325 performs the steps of this figure, except the last which occurs on the mobile device 108. In a first step 772, Web site application 325 looks for slide ID 316b in the slide ID 316 column of slide ID table 342 and uses image path 346 of the record found to locate image 306b.

Then, it copies Web page base 329 into a new Web page 354 and adds to it slide ID 316c and image 306c, respectively copies of slide ID 316b and image 306b (step 774). This step also copies bookmark button 330b, share button 331b, hidden third-party links dialog 332b and optionally polling mechanism 334b, page refresh 335b, and slide link 337b, into bookmark button 330c, share button 331c, hidden third-party links dialog 332c and optionally polling mechanism 334c, page refresh 335c, and slide link 337c, respectively.

If the user is logged in, the page returned also includes user ID 347c. If a password was required and was successfully entered, the page returned also includes password 317c.

Optionally, if image 306bb is present, it may be placed in Web page 354 instead of image 306b, for example when the communication with Web browser 352 is slow or if the display of Web browser 352 is small (for example less than 250×250 pixels).

Optionally, if sharing 345 is implemented and is "false", share button 331b is removed from Web page 354.

Then, a test is performed (step 778): if the user is logged in (user ID 347c is received as part of the request), another test is performed (step 780): if the pair (User ID 347b of user logged in associated with user ID 347c, Slide ID 316b) is found in bookmark table 344, bookmark button 330c is set "on" (step 782).

Then Web site application 325 sends completed Web page 354 to mobile device 108 (step 784). Then, Web browser 352 displays Web page 354 (step 786).

If in step 778 the user is not logged in, log in button 414 is added to Web page 354 (step 788). Then, step 784 comes next.

If in step 780 the pair (User ID of user logged in, Slide ID 316b) is not found in bookmark table 344, the next step is 784.

The display of bookmark button 330b and share button 331b when the user is not logged in is a way to remind the user of the bookmarking and sharing capabilities of the embodiment, but it is optional. Alternatively, bookmark button 330b and share button 331b are not part of Web page base 329 and are added to Web page 354 between steps 778 and 780.

FIG. 8 is a flowchart that depicts an example of steps to toggle bookmarking of a slide 306 on and off. In a first step 801, Web browser 352 detects that bookmark button 330c was clicked. Then a test is performed (step 802): if the user is logged in, Web browser sends slide ID 316c, user ID 347c, in a bookmark state toggle request message to Web site application 325 (step 804).

Then, Web site application 325 looks for the pair (user ID 347b associated with user ID 347c, slide ID 316c) in bookmark table 344 (step 806). If the pair is found in bookmark table 344, it is removed from it (step 808). Then a new bookmark message is set to "off" (step 810). Then, the message is sent to Web page 354 within Web browser 352 as the return message for the request issued in step 804 (step 812). Then, bookmark button 330c is set to the value of the bookmark message received (step 814).

If the user is not logged in during step 802 above, step 704 of FIG. 7A comes next, with the addition that slide ID 316c is also sent to Web site application 325 in step 707. Later, if login information is correct in step 708 of FIG. 7A, the flow returns to FIG. 8 and a test comes next (step 816): if the pair (user ID 347b associated with the log in/join information sent in step 707, slide ID 316c) is not present in bookmark table 344, it is added to it (step 818).

Then, a new bookmark message is set to "on" (step 820) and step 812 comes next. The association between user ID and log in/join information can be made in a number of ways, for example by using associate functionality in the open source content management system Drupal 6.

If in step 816 the pair is present in bookmark table 344, step 820 comes next. If in step 806 the pair is not found in bookmark table 344, step 818 comes next.

FIG. 9A is a flowchart that depicts an example of steps to share a slide being presented. In a first step 902, Web page 354 detects that share button 331c was clicked. Then, it displays third-party links dialog 332c (step 904). Then it detects that a link of the dialog was clicked (step 906). Then a test is performed (step 908): if the user is not logged in, step 704 of FIG. 7A comes next.

In step 707 of FIG. 7A, slide ID 316c and the name of third-party site 338 are also sent to Web site application 325. If login information is correct in step 708, the steps come back to FIG. 9A. Then, if Web site 322 implements message posting by its members, a test is performed (step 910): if the link clicked in step 906 is that of Web site 322, linked message 396 is created and displayed on behalf of the user of device 108 (step 911).

Linked message 396 indicates, in essence, that the user of mobile device 108 saw an interesting slide. In the creation of linked message 396, the link URL is set to slide ID 316c on Web site 322, and optionally image 306b and presentation URL 304b are copied into image 306d (optionally scaled down) and presentation URL 304d, which are then included in the message. In some embodiments, the user is given the option to personalize the message.

Optionally, a Web page component-caching mechanism may be used to deliver linked message 396 without re-computation once it has been created. Examples of Web page component-caching mechanisms that can be used in this capacity include Varnish™, and Memcached.

If in step 910 above the link clicked is for third-party site 338, a test is performed next (step 912): if the logged-in user's account is associated with an account on third-party site 338, linked message 396 is created in the same manner as described in step 911 above (step 914).

Then, Web site application 325 sends linked message 396 to third-party site 338 (step 915), with the request to post it on behalf of the user of mobile device 108 (step 915). Information identifying the user and Web site 322 is sent appropriate to the third-party site 338, example by using Drupal for Facebook module suite. Then, third-party site 338 posts the linked message (step 916) and the steps of FIG. 9A terminate.

If in step 908 the user is logged in, a linked message post request including slide ID 316c, user ID 347c and the name of third-party site 338 is sent to Web site application 325 (step 918), and step 910 comes next.

If in step 912 the logged-in user's account is not associated with an account on third-party site 338, message posting on behalf of the user is requested from third-party site 338 (step 920). This request follows a method known in the art, for example using the Drupal for Facebook module suite.

For example, third-party site 338 then asks the user to log in if the user is not logged in third-party site 338, and then requests, for example in a request Web page, to let Web site 322 post messages on the user's behalf (step 922). The request Web page detects user approval and sends approval information back to third-party site 338 (step 924). Then, third-party site 338 returns its approval and user account information back to Web site application 325 (step 926) and step 914 comes next.

If Web site 322 does not implement message posting by its members, step 912 comes immediately after step 918, and step 912 comes immediately after the steps return from FIG. 7A.

Figure 9B:
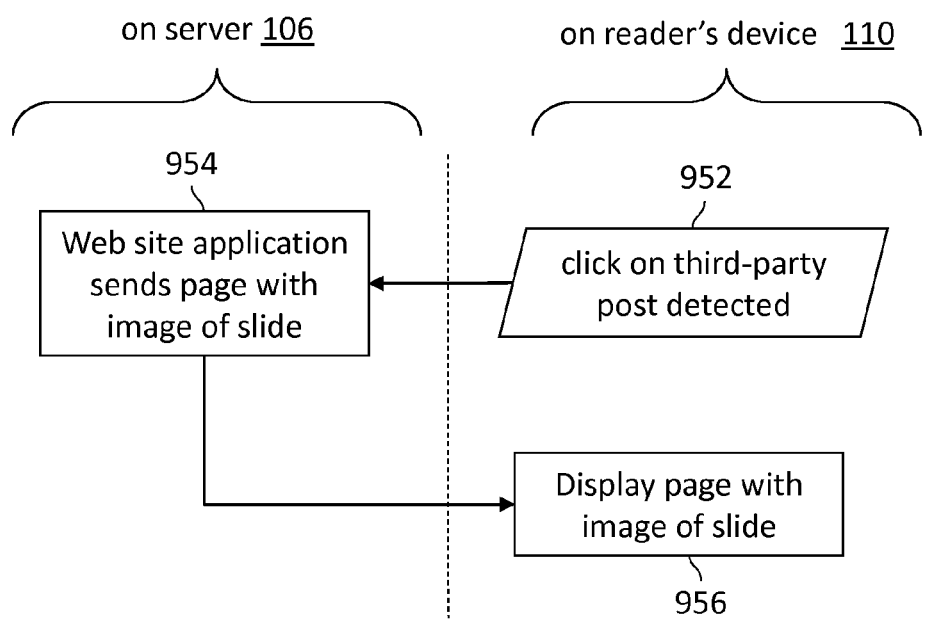
FIG. 9B is a flowchart that depicts an example of steps in conjunction with a reader of a third-party site viewing an image of a slide being shared by an audience member of a live presentation, according to some embodiments of the present invention.

FIG. 9B is a flowchart that depicts an example of steps for a reader of a third-party site 338 to view an image of a slide 306 shared by a member of the audience of a presentation show. The reader operates a computer 210 referred to herein as a "reader's computing device" 110, which simply means a computing device used by a party interacting with a third-party site 338. In a first step 952, a browser 352 or similar on a reader's computing device 110 displaying linked message 396 on third-party site 338 detects a click on the link of linked message 396, and requests the page at this address. Recall that the destination URL of the link of linked message 396 is slide ID 316b on Web site 322.

Then, Web site application 325 creates slide page 327, looks for the row of slide ID table 342 with slide ID 316 value equal to slide ID 316c to get image path 346 and locate image 306b, places a copy of image 306b in slide page 327, and sends the page back (step 954). Then, browser 352 on reader's computing device 110 displays slide page 327, and the steps of FIG. 9B terminate.

It is to be understood that the bookmarking and sharing functionalities described herein are independent: some embodiments implement one, some the other, and some both.

In one embodiment, presentations are uploaded to server 106, and images 306a of slides 306 are not on clients 102. In such an embodiment, the case conversion from presentation to images is available on server 106.

Figure 10:
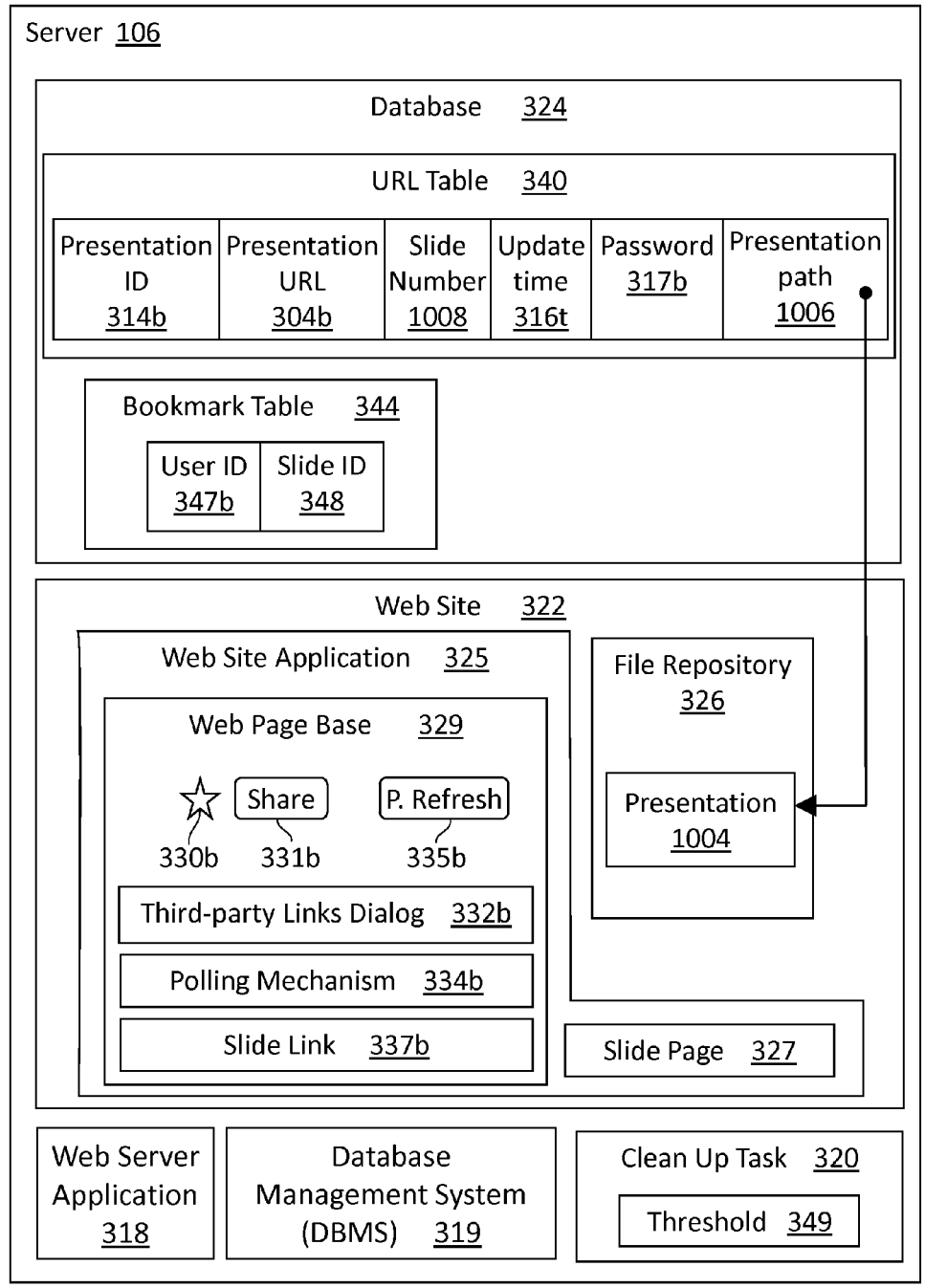
FIG. 10 is a block diagram of a specific instantiation of certain features of a slide management system, according to some embodiments of the present invention.

FIG. 10 illustrates a server 106 configured according to one embodiment in which presentations are uploaded to server 106. FIG. 10 differs from FIG. 3B in the following ways: slides 306 are not stored individually. Instead, a copy of presentation document 304 is stored as presentation 1004 in file repository 326 and is identified via a presentation path 1006, added to the record of URL table 340 uniquely identified by presentation ID 314b.

Slide ID 316b is a globally unique ID for slide 306 being presented. For example, it can be the concatenation of presentation ID 314b plus a separation character (e.g. "-") plus a slide number 1008b of slide 306 within presentation 1004. Slide number 1008b is stored instead of slide ID 316b in slide table 340.

Similarly, slide ID 348 is globally unique among slides of presentations on server 106 (as in FIG. 3B) and is created in the same manner as 316b.

When an URL request for slide ID 316b within Web site 322 is issued, Web site application 325 uses a mechanism to create slide 327, as described below in more detail as step 954'.

Slide ID table 342, slide ID 316, image path 346, image 306b and image 306bb are not utilized in the embodiment of FIG. 10.

Optionally, a presentation browsing mechanism can be added to allow the audience to browse through presentation 1004: for example, "next" and "previous" links are added to slide page 327 to display respectively images of the next and previous slides in presentation order. When the "next" or "previous" link is clicked, Web site application 325 extracts a slide number from slide ID 316b, adds one to it or subtracts one from it (respectively), and uses the slide number computed to create a new slide page 327 following the mechanism described below as step 954'.

Presentation 1004 is found through presentation path 1006 of the record of URL table 340 uniquely identified by presentation ID 314b.

Figure 11:
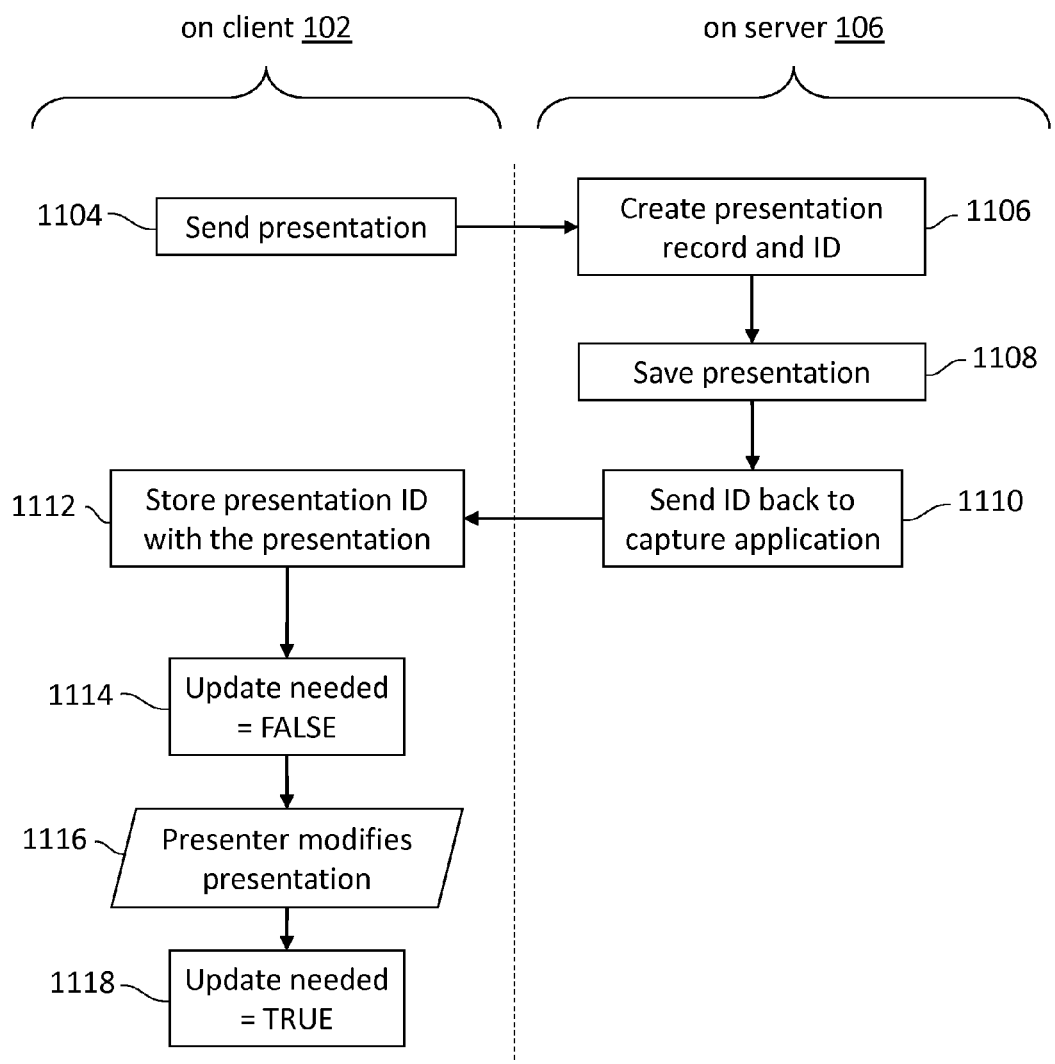
FIG. 11 is a flowchart that depicts an exemplary process of presentation upload from client to server, according to some embodiments of the present invention.

FIG. 11 is a flowchart that depicts an exemplary process of presentation upload from client 103 to server 106 as per the embodiment of FIG. 10. In a first step 1104, slide capturing application 308 sends presentation 1004, copy of presentation document 304, to Web site application 325. Then, Web site application 325 adds a new record to URL table 340 and the globally unique key (within URL table 340) returned by DBMS 319 for that new record becomes presentation ID 314b (step 1106).

Then, Web site application 325 saves presentation 1004 in file repository 326 and adds its path as presentation path 1006 in the record uniquely identified by presentation ID 314b in URL table 340 (step 1108). Then, Web site application 325 sends presentation ID 314b back to slide capturing application 308 (step 1110). As part of the data communication and transfer, presentation ID 314b is copied into presentation ID 314a on client 103. Then, slide capturing application 308 stores presentation ID 314a with presentation document 304 (step 1112).

Then, slide capturing application 308 sets update needed 315 to false (step 1114). Then, slide capturing application 308 detects if the presenter modifies presentation document 304 (step 1116), in which case it sets update needed 315 to true (step 1118). In another embodiment, update needed 315 is not implemented, the steps of FIG. 11 terminate after step 1112, and the detection of modification to presentation document 304 is performed in step 604 instead of a check of update needed 315.

In the embodiment of FIG. 10, the steps depicted in FIG. 6A can be used, with step 610 replaced by the following step 610': slide capturing application 308 sends a copy of presentation ID 314a, called presentation ID 314bb, and the slide number of the slide being presented to Web site application 325. As presentation ID 314bb is a copy of presentation ID 314a, and presentation ID 314a is a copy of presentation ID 314b (as per step 1110 of FIG. 11), presentation ID 314b equals presentation ID 314bb.

Step 616 is replaced by modified step 616': the slide number sent is stored in slide number 1008b. In steps 626' and 628', modified versions of steps 626 and 628, the invalid slide ID is replaced by an invalid slide number, for example a negative number.

In the embodiment of FIG. 10, the steps of FIG. 7B can be used with slide number 1008b replacing slide ID 316b and "valid slide number" replacing "valid slide ID".

In the embodiment of FIG. 10, the steps of FIG. 7C can be used, with steps 772 through 774 replaced by the following: in a step 772', Web site application 325 uses presentation path 1006 of the record of URL table 340 found in FIG. 7B to locate presentation 1004. Then, in a step 774' it copies Web page base 329 into a new Web page 354, creates an image of the slide of presentation 1004 at position slide number 1008b (in the record of URL table 340 found in FIG. 7B), and saves this image in Web page 354. In step 780, slide ID 316b is for example the concatenation of presentation ID 314b, "-" and slide number 1008b.

In the embodiment of FIG. 10, the steps of FIG. 9B can be used, with step 954 replaced by the following step 954': from slide ID 316b (part of the URL request it receives) Web site application 325 extracts presentation ID 314b and a slide number, creates an image of this slide of presentation 1004 and places it into a new slide page 327. Presentation 1004 is found through presentation path 1006 of the record of URL table 340 uniquely identified by presentation ID 314b. Web site application 325 may also include headers, footers, links, formatting and graphics used in other parts of Web site 322 to slide page 327. Optionally, a Web page component-caching mechanism is used to store page 327 once it has been created, and to deliver it without re-computation thereafter.

Then, in a new step, it sends the page back to readers' device 110 and step 956 comes next.

Figure 12A:
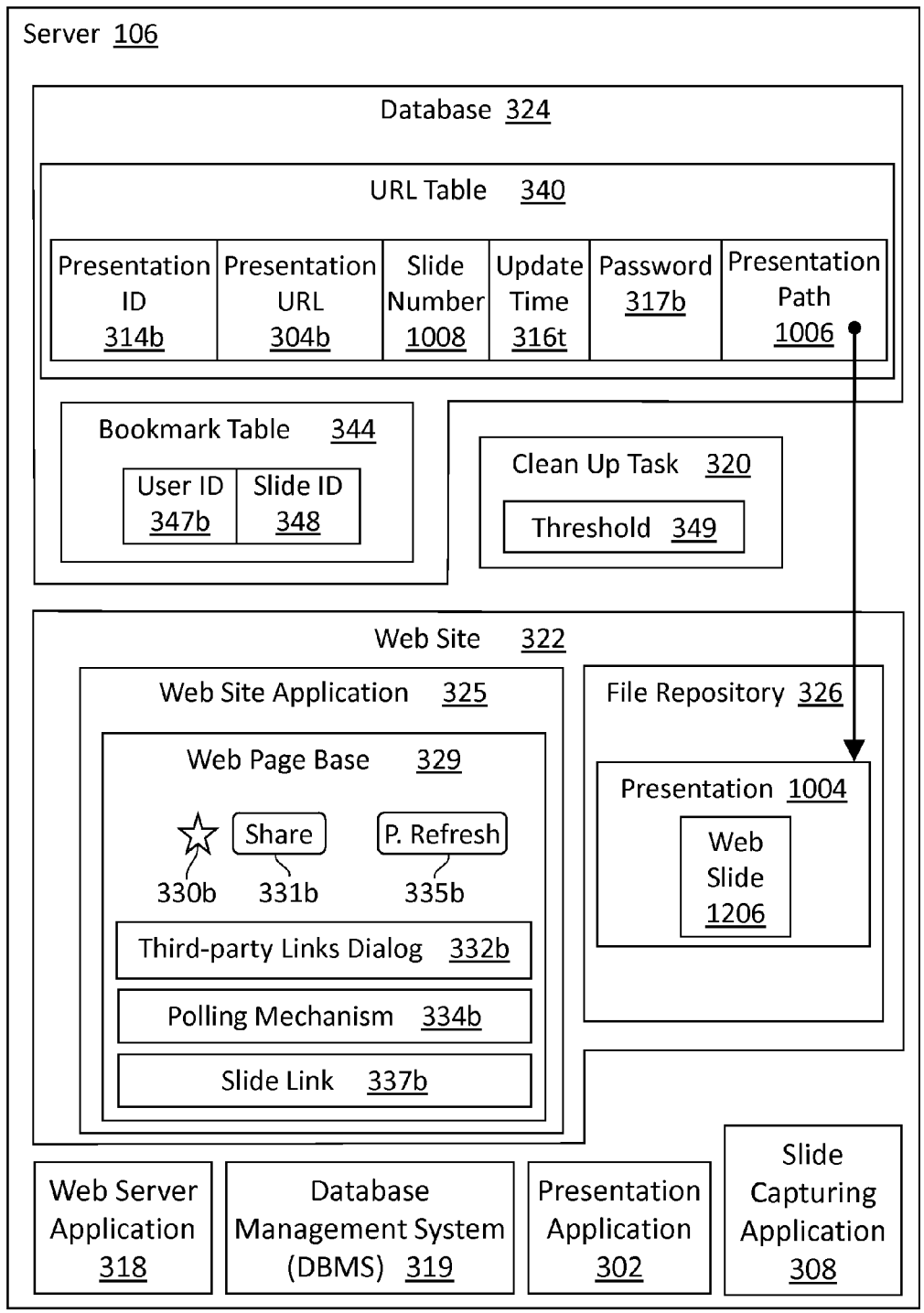
FIG. 12A is a block diagram of a specific instantiation of certain features of a slide management system, according to some embodiments of the present invention.

FIG. 12A illustrates an embodiment in which the presentation application 302 and slide capturing application 308 resides on the server 106. In one embodiment, slide capturing application 308 is integrated into presentation application 302. With these components on the server 106, the client side functionality can be instantiated in a Web browser 352 on the client 102 (not illustrated in FIG. 12A). Optionally, Web browser 352 may contain a local copy of presentation 1004 as well as a mechanism to display slides or Web pages of the presentation copy even when there is no communication between client 102 and server 106, for example following W3C®'s HTML5 specifications.

Referring to FIG. 12A, Web slide 1206 refers to the slide at position slide number 1008b in presentation 1004. Presentation 1004 may be embodied as a set of Web pages to be displayed in a specific sequence (e.g., an ordered list of Web pages). Web pages include graphical elements that can be created, edited and displayed using Web browser 352. In this case, Web browser 352 functions as the user interface of presentation application 302, Web slide 1206 is a Web page and it is used instead of a slide page 327.

Figure 12B:
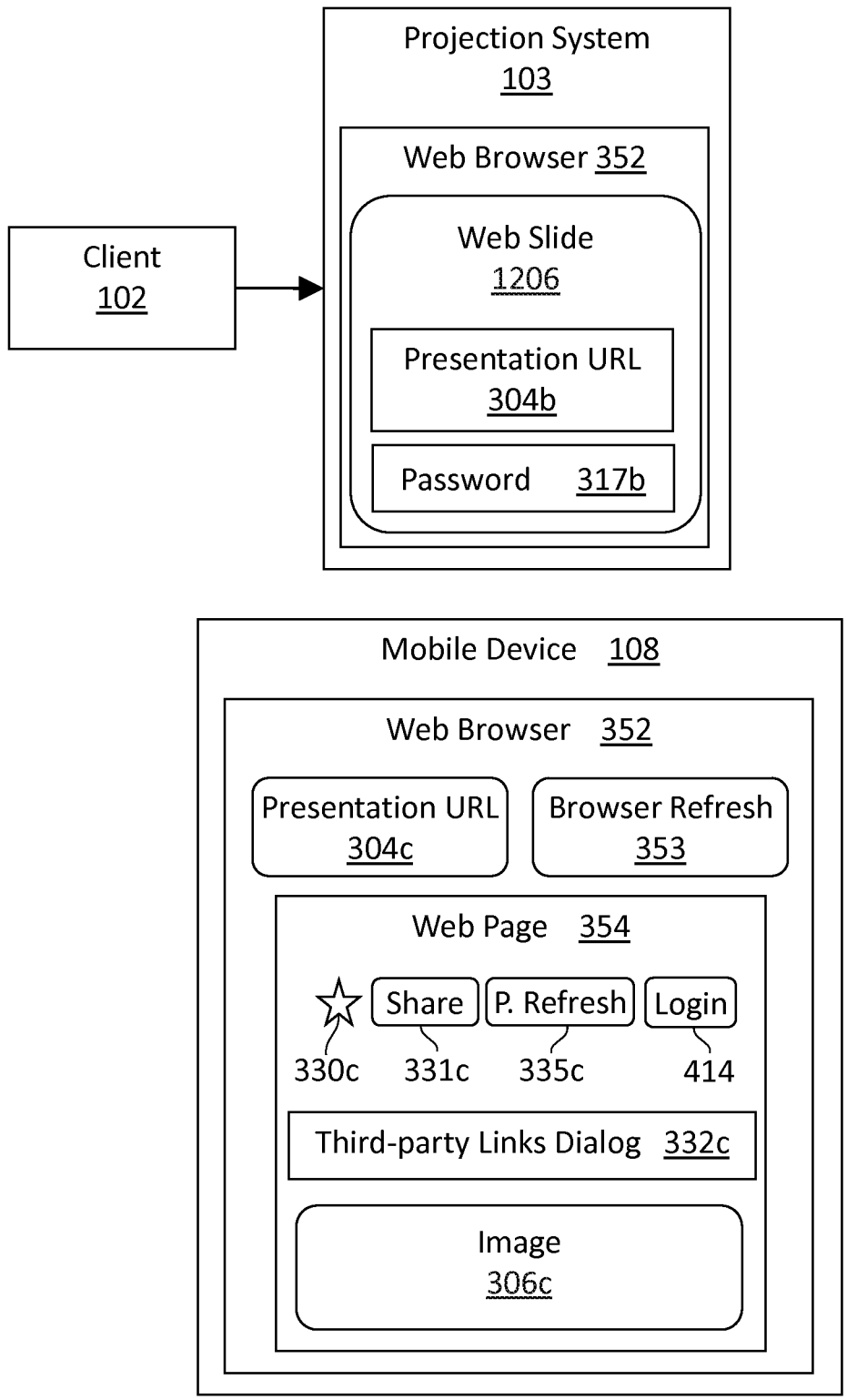
FIG. 12B is a block diagram of exemplary visual elements, according to some embodiments of the present invention.

FIG. 12B depicts an example of visual elements of client 103 (FIG. 1), projection system 103 and a mobile device 108 during a live presentation show, according to the embodiment of FIG. 12A. FIG. 12B is similar to FIG. 4, but there is no presentation application 302 on the client 102, and instead Web browser 352 is present and displayed on projection system 103. Slide 306, presentation URL 304a and password 317a on the projection system 103 are replaced by Web slide 1206, presentation URL 304b, and password 317b, respectively.

Figures 13A, 13B:
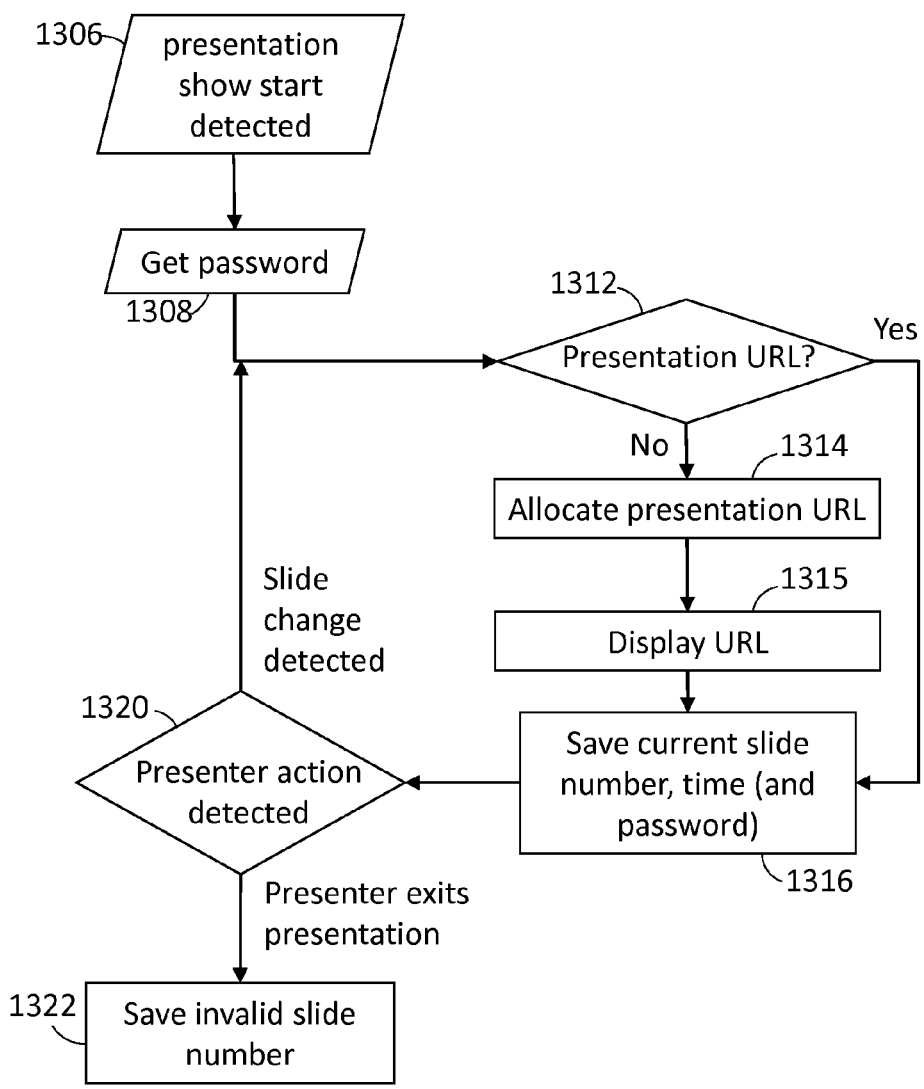
FIG. 13A is a flowchart of actions taken upon presentation creation, according to some embodiments of the present invention.
FIG. 13B is a flowchart that depicts an example of process of presentation show start, according to some embodiments of the present invention.

FIG. 13A is a flowchart that depicts an example of a URL table entry creation process. In a first step 1302, slide capturing application 308 detects the creation of a new presentation, and adds a new record to URL table 340, such that the globally unique key (within URL table 340) returned by DBMS 319 for that new record becomes presentation ID 314b (step 1304).

FIG. 13B is a flowchart that depicts an example of a process of presentation show start. In a first step 1306, slide capturing application 308 detects that a presentation show is started on Web slide 1206.

Optionally, if password protection is implemented, a dialog opens with a password request and password 317b is captured (step 1308). If password protection is not implemented, step 1312 comes next.

Optionally, if sharing 345 is implemented, the choice of whether to let the audience share slides is captured, for example in the dialog of step 1308 or otherwise (step 1308').

Then, Web site application 325 checks whether the record identified by presentation ID 314b in URL table 340 has a valid presentation URL 304b (step 1312). If it does not, it allocates one (step 1314), such as a path on Web site 322, for example a number with two or three digits, large enough to accommodate the maximum total number of live presentations that Web site 322 may support concurrently. It displays the new presentation URL 304b on projection system 103 if it is present, or on personal display screen 214 otherwise (step 1315). The presenter can hide and show the display of presentation URL 304b by using the Toggle Event, as described in conjunction with FIG. 4 above.

Then, Web site application 325 places the slide number of Web slide 1206 into slide number 1008b of the record of URL table 340 identified by presentation ID 314b, and places the current date and time in update time 316t of the same record (step 1316).

Optionally, if password protection is implemented and is part of the message received from slide capturing application 308 in step 1312, password 317b is placed in the same record. Optionally, if sharing 345 is implemented and the presenter's sharing choice is part of the message received from slide capturing application 308 in step 1312, the presenter's sharing choice is placed into sharing 345 of the same record.

If the record has a valid presentation URL in step 1312, the next step is 1316.

Then, slide capturing application 308 detects presenter action (step 1320): if it detects a slide change, the next step is 1312; otherwise, if it detects an exit from the presentation, the steps of FIG. 13B terminate, or optionally Web site application 325 places an invalid value into slide number 1008b of the record of URL table 340 identified by presentation ID 314b, if that record is present (step 1322), and then, the steps of FIG. 13B terminate.

In another embodiment, server 106 includes one or more Web sites allowing message posting by members, and there are no third-party servers 112. In this case, third-party site 338 is located on server 106 and the functionality of third-party Web server application 392 is executed by Web server application 318.

It is to be understood that according to various embodiments of the present invention, using the slide capturing application 308 functionality (implemented at a client or server level), an audience member can capture detailed images of specific slides 306 being presented in real time, using for example a mobile computing device 108 such as a smartphone. As presentations typically include many slides 306, being able to bookmark a few specific slides 306 of interest represents a significant productivity gain. During conferences in particular, attendees typically attend many presentations over the course of a few days. The ability to bookmark individual slides 306 in real time saves attendees significant time, because they do not need to go over the voluminous presented material afterwards to find specific slides 306 of interest. This allows users to skip the research step, and create a new presentation or report for their organization with bookmarked slides 306. The process of capturing, gathering, processing and presenting takeaways from a live presentation or conference is thereby greatly simplified.

Audiences can also share specific slides 306 being presented in real time, using for example a mobile computing device 108 such as a smartphone. This enables audience members to fuel their social network activity. Sharing of slides 306 can also increase the real time presentation audience by leveraging the social networks of the audience members. In the case of a conference, this can bring real time, highly differentiated buzz that grows over the course of the conference.

In some embodiments lasting Web links to the presentation material are created, increasing the status of the presenter. The linked messages on social media sites and the replies and forwards of these messages by the social networks of audience members are lasting and searchable messages that increase the number of links to the presentation material.

The system also degrades gracefully. If access to the Internet degrades significantly or becomes unavailable during the presentation, in embodiments with presentation capabilities on the client 102, the presenter can continue to present.

Furthermore, audience members who have difficulty clearly seeing the presentation on the projection system 103 can follow the presentation on their mobile devices 108, and see details of individual slides 306.

As will be understood by those familiar with the art, the claimed subject matter may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the claimed subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method of isolating and processing individual slides of a live presentation in real-time, the method comprising the steps of:
   associating a specific user with a user account of a site on which the specific user can post content;
   providing a single specific Uniform Resource Locator ("URL") on a network for displaying a real-time digital presentation comprising a plurality of slides in a specific sequence, wherein each slide of the presentation is formatted as a web page, by a computer;
   while each specific one of the plurality of slides is being displayed in the specific sequence on a video output device as dynamic content at the single specific URL on the network, enabling the specific user to post a link to the specific one of the plurality of slides that is currently being displayed, to the site on which the specific user can post content;
   receiving an indication from the specific user to post at least a link to a specific separate slide currently being displayed at a first time among the dynamic content, to the site on which the specific user can post content; and
   in response to the received indication, taking an action to post at least the link to the specific separate slide being displayed at the first time among the dynamic content, on the site on which the specific user can post content,
   wherein an activation of the link to the specific separate slide posted on the site, results in providing the specific separate slide being displayed at the first time, among the dynamic content.

2. The method of claim 1 further comprising:
   enabling the specific user to post a link to the slide currently being displayed to a specific social networking site; and
   in response to the received indication, taking an action to post, on a social networking site account associated with the specific user, a message in a format used by the specific social networking site, the message comprising at least the link to the specific separate slide.

3. The method of claim 1 wherein the site on which the specific user can post content further comprises a third-party site, the method further comprising:
   sending a directive to the third-party site to post, on an account on the third-party site associated with the specific user, at least a link to the specific slide being displayed when the indication was received.

4. The method of claim 3 wherein:
   the third-party site further comprises a social networking site.

5. The method of claim 1 further comprising:
   associating each specific one of a plurality of users with a corresponding user id; and
   associating each specific user id with at least one specific account on at least one specific site on which the specific user can post content.

6. The method of claim 1 wherein:
   the computing device further comprises a mobile computing device.

7. The method of claim 1 wherein:
   the computing device further comprises a smartphone.

8. The method of claim 1, further comprising:
   receiving an indication from the specific user to post at least a link to a specific separate slide currently being displayed at a second time among the dynamic content, to the site on which the specific user can post content, the specific separate slide displayed at the first time differing from the specific separate slide displayed at the second time; and
   in response to the received indication, taking an action to post at least the link to the specific separate slide being displayed at the second time among the dynamic content, on the site on which the specific user can post content,
   wherein an activation of the link to the specific separate slide being displayed at the second time among the dynamic content posted on the site results in providing the specific separate slide.

9. The method of claim 1, further comprising:
   while each specific one of the plurality of slides is being displayed in the specific sequence on the video output device, maintaining, at a single specific location on a network, a single web page with dynamic content comprising an image of the specific one of the slides currently being displayed on the video output device;
   displaying the specific location on the network on the video output device, during at least one point while displaying specific ones of the plurality of slides; and
   responsive to a user of a computing device accessing the specific location on the network, providing, to the user, the single web page with dynamic content comprising an image of the specific one of the slides that is currently being displayed on the video output device when the user's access of the specific location on the network occurs.

10. The method of claim 9 wherein:
    the computing device further comprises a mobile computing device.

11. The method of claim 9 wherein:
    the computing device further comprises a smartphone.

12. At least one non-transitory computer-readable storage medium for isolating and processing individual slides of a live presentation in real-time, the at least one non-transitory computer-readable storage medium storing computer executable instructions that, when loaded into computer memory and executed by at least one processor of a computing device, cause the computing device to perform the following steps:
    associating the specific user with a user account of a site on which the specific user can post content;
    providing a single specific Uniform Resource Locator ("URL") on a network for displaying a real-time digital presentation comprising a plurality of slides in a specific sequence, wherein each slide of the presentation is formatted as a web page, by a computer;
    while each specific one of the plurality of slides is being displayed in the specific sequence on a video output device as dynamic content at the single specific URL on the network, enabling the specific user to post a link to the specific one of the plurality of slides that is currently being displayed, to the site on which the specific user can post content;
    receiving an indication from the specific user to post at least a link to a specific separate slide currently being displayed at a first time among the dynamic content, to the site on which the specific user can post content; and in response to the received indication, taking an action to post at least the link to the specific separate slide being displayed at the first time among the dynamic content, on the site on which the specific user can post content; and wherein an activation of the link to the specific separate slide posted on the site, results in providing the specific separate slide being displayed at the first time, among the dynamic content.

13. The at least one non-transitory computer-readable storage medium of claim 12 further storing computer executable instructions to perform the following additional steps:

enabling the specific user to post a link to the slide currently being displayed to a specific social networking site; and in response to the received indication, taking an action to post, on a social networking site account associated with the specific user, a message in a format used by the specific social networking site, the message comprising at least the link to the specific separate slide.

14. The at least one non-transitory computer-readable storage medium of claim 12, wherein the site on which the specific user can post content further comprises a third-party site, further storing computer executable instructions to perform the following additional step:

sending a directive to the third-party site to post, on an account on the third-party site associated with the specific user, at least a link to the specific slide being displayed when the indication was received.

15. The at least one non-transitory computer-readable storage medium of claim 14 wherein:

the third-party site further comprises a social networking site.

16. The at least one non-transitory computer-readable storage medium of claim 12 further storing computer executable instructions to perform the following additional steps:

associating each specific one of a plurality of users with a corresponding user id; and associating each specific user id with at least one specific account on at least one specific site on which the specific user can post content.

17. The at least one non-transitory computer-readable storage medium of claim 12 further storing computer executable instructions to perform the following additional steps:

while each specific one of the plurality of slides is being displayed in the specific sequence on the video output device, maintaining, at a single specific location on a network, a single web page with dynamic content comprising an image of the specific one of the slides currently being displayed on the video output device;

displaying the specific location on the network on the video output device, during at least one point while displaying specific ones of the plurality of slides; and responsive to a user of a computing device accessing the specific location on the network, providing, to the user, the single web page with dynamic content comprising an image of the specific one of the slides that is currently being displayed on the video output device when the user's access of the specific location on the network occurs.

18. The at least one non-transitory computer-readable storage medium of claim 17 wherein:

the computing device further comprises a mobile computing device.

19. The at least one non-transitory computer-readable storage medium of claim 17 wherein:

the computing device further comprises a smartphone.

20. A computer system for isolating and processing individual slides of a live presentation in real-time, the computer system comprising:

a processor; and system memory comprising:

a component residing in the system memory to associate a specific user with a user account of a site on which the specific user can post content;

a component residing in the system memory to provide a single specific Uniform Resource Locator ("URL") on a network for displaying a real-time a digital presentation comprising a plurality of slides in a specific sequence, wherein each slide of the presentation is formatted as a web page;

a component residing in the system memory to enable, while each specific one of the plurality of slides is being displayed in the specific sequence on a video output device as dynamic content on the single specific location on the network, enabling the specific user to post a link to the specific one of the plurality of slides that is currently being displayed, to the site on which the specific user can post content;

a component residing in the system memory to receive an, indication from the specific user to post at least a link to a specific separate slide currently being displayed, to the site on which the specific user can post content; and a component residing in the system memory to take, in response to the received indication, an action to post at least the link to the specific separate slide being displayed at the first time among the dynamic content, on the site on which the specific user can post content, wherein an activation of the link to the specific separate slide posted on the site results in providing the specific separate slide being displayed at the first time, among the dynamic content.

21. The computer system of claim 20 further comprising:

a component residing in the system memory to enable the specific user to post a link to the slide currently being displayed to a specific social networking site; and a component residing in the system memory to take, in response to the received indication, an action to post, on a social networking site account associated with the specific user, a message in a format used by the specific social networking site, the message comprising at least the link to the specific separate slide.

22. The computer system of claim 20, wherein the site on which the specific user can post content further comprises a third-party site, further comprising:

a component residing in the system memory to send a directive to the third-party site to post, on an account on the third-party site associated with the specific user, at least a link to the specific slide being displayed when the indication was received.

23. The computer system of claim 22 wherein:

the third-party site further comprises a social networking site.

24. The computer system of claim 20 further comprising:

a component residing in the system memory to associate each specific one of a plurality of users with a corresponding user id; and a component residing in the system memory programmed to associate each specific user id with at least one specific account on at least one specific site on which the specific user can post content.

25. The computer system of claim 20 further comprising:

a component residing in the system memory to maintain, while each specific one of the plurality of slides is being displayed in the specific sequence on the video output device, at a single specific location on a network, a single web page with dynamic content comprising an image of the specific one of the slides currently being displayed on the video output device;

a component residing in the system memory programmed to display the specific location on the network on the video output device, during at least one point while displaying specific ones of the plurality of slides; and a component residing in the system memory programmed to provide, responsive to a user of a computing device accessing the specific location on the network, to the user, the single web page with dynamic content comprising an image of the specific one of the slides that is currently being displayed on the video output device when the user's access of the specific location on the network occurs.

26. The computer system of claim 25 wherein:

the computing device further comprises a mobile computing device.

27. The computer system of claim 25 wherein:

the computing device further comprises a smartphone.

\* \* \* \* \*